(12) United States Patent
Ochiai et al.

(10) Patent No.: US 7,614,577 B2
(45) Date of Patent: Nov. 10, 2009

(54) HANDLE KNOB AND HANDLE ASSEMBLY FOR A FISHING REEL

(75) Inventors: Koji Ochiai, Osaka (JP); Keigo Kitajima, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 12/017,963

(22) Filed: Jan. 22, 2008

(65) Prior Publication Data

US 2008/0257996 A1    Oct. 23, 2008

Related U.S. Application Data

(62) Division of application No. 11/223,927, filed on Sep. 13, 2005, now Pat. No. 7,374,119.

(30) Foreign Application Priority Data

| Oct. 6, 2004 | (JP) | ............................. 2004-293325 |
| Feb. 28, 2005 | (JP) | ............................. 2005-054492 |
| Mar. 1, 2005 | (JP) | ............................. 2005-056467 |

(51) Int. Cl.
    *A01K 89/01* (2006.01)
(52) U.S. Cl. ........................... 242/283; 242/282; 74/545
(58) Field of Classification Search ................. 242/283, 242/282; 74/543, 545
    See application file for complete search history.

(56) References Cited

U.S. PATENT DOCUMENTS

| 2,251,782 | A | | 8/1941 | Coxe | |
| 2,316,266 | A | * | 4/1943 | Marr | ............................ 242/257 |
| 2,774,545 | A | | 12/1956 | Chambers | |
| 2,981,495 | A | * | 4/1961 | King | ............................ 242/265 |
| 3,071,023 | A | * | 1/1963 | Herr et al. | ....................... 74/545 |
| 5,429,317 | A | | 7/1995 | Yamaguchi | |
| 5,971,309 | A | | 10/1999 | Yamaguchi | |
| 6,042,037 | A | * | 3/2000 | Nanbu | ......................... 242/283 |
| 6,105,891 | A | * | 8/2000 | Ikuta et al. | ................... 242/283 |
| 6,626,385 | B1 | | 9/2003 | Tsutsumi | |
| 6,874,719 | B2 | | 4/2005 | Ikuta | |
| 6,883,738 | B2 | | 4/2005 | Nakajima et al. | |
| 6,988,684 | B2 | | 1/2006 | Hirayama et al. | |
| 2003/0218088 | A1 | | 11/2003 | Hirayama et al. | |
| 2004/0140385 | A1 | | 7/2004 | Nishikawa et al. | |

FOREIGN PATENT DOCUMENTS

| JP | 2001-269096 A | 10/2001 |
| JP | 2003-284463 A | 10/2003 |
| JP | 2004-236541 A | 8/2004 |

* cited by examiner

*Primary Examiner*—Emmanuel M Marcelo
(74) *Attorney, Agent, or Firm*—Shinjyu Global IP

(57) ABSTRACT

A handle assembly has a handle arm, a knob shaft and a handle knob that includes a tubular portion and a substantially spherical knob portion. The tubular portion is mounted on an outer peripheral surface of the knob shaft. The knob portion is unitarily formed with the tubular portion. The knob portion has a first knob with a substantially spherically shaped outer peripheral surface and a second knob that is disposed on a side of the first knob opposite the handle arm. The second knob has a substantially spherically shaped outer peripheral surface with a diameter larger than a diameter of the first knob. The second knob is unitarily linked with the first knob at a junction a distance from the outermost radial portion at a region of the knob portion opposite the tubular portion.

10 Claims, 25 Drawing Sheets

HANDLE KNOB AND HANDLE ASSEMBLY FOR A FISHING REEL

CROSS-REFERENCE TO RELATED APPLICATIONS

This is a divisional application of application Ser. No. 11/223,927, filed Sep. 13, 2005, which claims right of foreign priority to Japanese Patent Application Nos. 2004-293325, 2005-054492 and 2005-056467. The entire disclosures of Japanese Patent Application Nos. 2004-293325, 2005-054492 and 2005-056467 are hereby incorporated herein by reference.

BACKGROUND OF THE INVENTION

1. Field of the Invention

The present invention generally relates to a handle knob. More specifically, the present invention relates to a handle knob that is rotatively mounted to a knob shaft fixed to a tip of a handle arm of a fishing reel.

2. Background Information

A handle assembly is fixed to a tip of a handle shaft of a fishing reel, such as a spinning reel or a dual bearing reel. The handle assembly has a handle arm, a knob shaft and a handle knob. The handle knob is rotatively mounted to the handle shaft. The handle arm is non-rotatably mounted to the tip of the handle shaft. The knob shaft is fixed to the tip of the handle arm. The handle knob has an outer shape that can be grasped with a palm of a hand. The outer shape of the handle knob allows the handle knob to be firmly gripped during jigging. Thus, it will be easy to contribute a large amount of force. In addition, the handle knob must be firmly gripped when hooking a fish. Furthermore, the handle knob must be grasped with fingertips of a hand and rapidly rotated when reeling in fishing line. With the outer shape of the handle shaft having a substantially spherical shape, one can smoothly and continuously move from hooking to reeling without changing the grip on the handle knob during operation.

The handle knob with an outer shape that is substantially spherical on an outermost radial position on a side closest to the handle arm is known to give one a feeling that the handle knob fits well in a grasp. Accordingly, the outer shape of the handle knob is substantially conical on the outermost radial position opposite the side closest to the handle arm. (See, for example, Japanese Patent Publication No. 2003-284463.) This type of handle knob can obtain the fit feeling by placing one's fingertips on the substantially spherical portion and placing the base of one's fingers on the substantially conical portion.

With this type of handle assembly, it is known to provide a cavity in the interior of the handle knob, and to provide a hollow structure, in order to reduce the weight of the entire reel. (See, for example, Japanese Patent Publication No. 2004-236541.) This type of handle knob is made of a metal such as brass or the like. The handle knob has a tubular portion, a substantially hemispherical first knob and a substantially hemispherical second knob. The tubular portion is mounted on an outer peripheral surface of the handle shaft. The first knob is unitarily formed on the outer periphery of the tubular portion. The second knob is detachably mounted on the first knob in a position on the opposite side of the handle arm of the first knob. The second knob is a member having the same qualities as that of the first knob. The second knob is made of metal such as brass or the like. Here, by mounting a screw member inserted from the outer peripheral portion of the second knob into a boss that is unitarily formed so as to have a large diameter on the outer periphery of the tip of the tubular portion, the second knob can be detachably mounted on the first knob.

Because the former conventional handle knob is formed so that the outer shape thereof is substantially spherical on the outermost radial position on the handle arm side, and so that the outer shape thereof is substantially conical on the outermost radial position opposite the handle arm side, a fit feeling can be obtained when grasping and operating the handle knob.

However, when firmly grasping the entire handle knob with one's palm, a gap may be produced between the palm and the end portion of the handle knob. This is because the end portion is formed in a flat shape such that the outer shape of the knob handle opposite the handle arm (the side on which the palm is placed) is substantially conical. Thus, when a gap is produced between the palm and the end of the handle knob, the ability of the handle knob to be grasped is reduced and the handle knob cannot be firmly grasped.

In addition, because the outermost radial position of the handle knob is arranged so that the junction positions of the substantially spherical portion and the substantially conical portion are the same, the outermost radial position is arranged in a position that is comparatively separated from the palm. Here, the ability to grasp the handle knob may be further reduced because, when the handle knob is grasped, the trunk portion of the fingers is placed on the outermost radial position.

The boss of the latter conventional handle knob that serves to mount the screw member is unitarily formed so as to have a larger diameter on the outer periphery of the tip of the tubular portion. However, because the tubular portion is unitarily formed with substantially hemispherical first knob, when for example the tubular portion and the first knob are formed by die casting, a mold with complex shapes must be employed to form a large diameter boss on the tip of the tubular member, and thus forming the boss is extremely difficult. Accordingly, forming the boss by means of post-processing such as machining or the like has been considered, but this processing is labor intensive and most likely increases manufacturing costs.

In addition, because the latter conventional first knob and the second knob of the aforementioned conventional handle knob are formed by means of members made of a metal such as brass or the like, the external appearance is made more attractive, and the feeling when the first knob and the second knob are grasped is improved. In order to further reduce the weight of this type of handle knob, forming at least one of the first knob and the second knob from a comparatively lightweight material such as a synthetic resin or the like has been considered. However, when both the first knob and the second knob are formed from a synthetic resin, the attractiveness of the external appearance is possible lowered than when compared to the first knob and the second knob being made of brass. In addition, when one of the first knob and the second knob is formed from a synthetic resin, and the other of the first knob and second knob is formed from brass, the first knob which is in contact with the fingertips and the second knob which is in contact with the palm will feel different when the handle knob is grasped. Thus the fisherman most likely feels a sense of incongruity.

In view of the above, it will be apparent to those skilled in the art from this disclosure that there exists a need for an improved handle knob that has characteristics that allow a better grip. This invention addresses this need in the art as well as other needs, which will become apparent to those skilled in the art from this disclosure.

SUMMARY OF THE INVENTION

An object of the present invention is to improve the ability of a handle knob of a fishing reel to be grasped.

Another object of the present invention is to make it possible to detachably mount the second knob of the handle knob of the fishing reel on the first knob with an inexpensive construction.

Yet another object of the present invention is to reduce the overall weight of the handle knob of the fishing reel and to maintain a high level of attractiveness of the outer appearance of the handle knob while improving the feeling thereof when grasped.

A handle knob according to a first aspect of the present invention is a handle knob for a fishing reel that includes a tubular portion and a knob portion. The tubular portion has an axis running therethrough in an axial direction. The knob portion includes an outermost radial portion, a first knob and a second knob. The first knob has a substantially spherically shaped outer peripheral surface connected to the tubular portion. The second knob is disposed on a side of the first knob opposite the tubular portion. The second knob has a substantially spherically shaped outer peripheral surface with a diameter larger than a diameter of the first knob. The second knob is unitarily linked with the first knob at a junction a distance from the outermost radial portion at a region of the knob portion opposite the tubular portion.

In this handle knob, the knob portion has a first knob disposed on the handle arm side and whose outer peripheral surface is formed into a substantially spherical shape; and a second knob that is disposed on the opposite side of the handle arm, the outer peripheral surface thereof is formed into a substantially spherical shape having a diameter larger than the first knob, and is unitarily linked with the first knob in a position on the opposite side of the handle arm from the outermost radial portion of the first knob.

Here, because the outer peripheral surface of the second knob disposed on the opposite side of the handle arm is formed into a substantially spherical shape, it is difficult for a gap to be produced between a palm and an end of the second knob when firmly grasping the entire handle knob. Thus, the palm is placed on the handle knob and the handle is firmly grasped. Thus, the ability to grasp the handle knob is improved.

In addition, because the outer peripheral surface of the second knob is formed into a substantially spherical shape with a diameter larger than a diameter of the first knob, and linked in a position on the opposite side of the handle arm from the outermost radial portion of the first knob, the outermost radial position is positioned in a position comparatively closer to the palm than the conventional link position and the conventional outermost radial position which are the same location. Thus, the ability to grasp the handle knob is improved.

The handle knob according to a second aspect of the present invention is the handle knob of the first aspect of the present invention, in which a length in the axial direction between an end of the first knob and the outermost radial position of the first knob is longer than a length in the axial direction between an end of the second knob and the outermost radial position. In this situation, because the length in the axial direction between the end of the second knob and the outermost radial position of the first knob is formed to be short, the end of the second knob and the outermost radial position of the first knob are disposed in positions that are near each other.

The handle knob according to a third aspect of the present invention is the handle knob of the second aspect of the present invention, in which the length in the axial direction of the first knob is longer than a length in the axial direction of the second knob. In this situation, because the length in the axial direction of the second knob is formed to be short, the end of the second knob and the outermost radial portion of the first knob are disposed in positions that are even closer to each other.

The handle knob according to a fourth aspect of the present invention is the handle knob of any of the first through third aspects of the present invention, in which the outer peripheral surface of the first knob is formed by means of a curved surface that is an arc centered on a position that is offset from the knob shaft and rotated around the knob shaft. In this situation, the first knob is formed so as to be a flat spherical shape that spreads radially outward with respect to the knob shaft.

The handle knob according to a fifth aspect of the present invention is the handle knob of any of the first through fourth aspects of the present invention, in which the outer peripheral surface of the second knob is formed by means of a spherical surface that is an arc centered on a position that is concentric with the knob shaft and deflected on the handle arm side and rotated around the knob shaft. In this situation, the second knob is formed in a substantially spherical shape with a diameter larger than a diameter of the first knob. The end of the second knob and the outermost radial position of the first knob are disposed in positions that are even closer to each other.

The handle knob according to a sixth aspect of the present invention is the handle knob of any of the first through fifth aspects of the present invention in which the first knob and the second knob are linked so that the outer peripheral surfaces are smooth. In this situation, the exterior design is improved and the feeling of grasping the handle knob is made superior.

A handle knob according to a seventh aspect of the present invention is a handle knob for a fishing reel that includes a tubular portion.

The handle knob according to an eighth aspect of the present invention is the handle knob according to the seventh aspect of the present invention, further comprising an attachment member with an inner peripheral portion mounted and fixed to an outer periphery of the tip of the tubular portion, and an outer peripheral portion configured to be screwed to the second knob by a plurality of screw members inserted from outside of the outer peripheral surface of the second knob. In this situation, because the attachment member on which the screw members are mounted is arranged separately from the tubular portion, it is no longer necessary to form a large diameter boss on the outer periphery of the tip of the tubular portion as is conventional. Thus, because it is no longer necessary to machine the boss as is conventional, the second knob is detachably mounted on the first knob with an inexpensive construction.

The handle knob according to a ninth aspect of the present invention is the handle knob of the eighth aspect of the present invention, in which the second knob further has a through hole that passes through the surface on the opposite side of the handle arm. The attachment member communicates with the through hole on the surface opposite the handle arm side of the outer peripheral portion and has a first female threaded portion that is screwed onto the first male threaded portions formed on the outer peripheries of the screw members. In this situation, the through holes and the first female threaded portions facilitate attaching and detaching the second knob from the first knob.

The handle knob according to a tenth aspect of the present invention is the handle knob of the eighth or ninth aspect of the present invention, in which the tubular portion has a second male threaded portion that is formed on the outer periphery of the tip of the tubular portion. The attachment member has a second female threaded portion that is formed in the inner peripheral portion thereof. Accordingly, the attachment member threads onto the second male threaded portion. In this situation, it is easier to attach and detach the attachment member from the tubular portion.

The handle knob according to an eleventh aspect of the present invention is the handle knob according to any of the eighth through tenth aspects of the present invention, in which the attachment member is adhesively fixed to the outer periphery of the tip of the tubular portion. In this situation, the attachment member is firmly fixed to the tubular portion.

The handle knob according to a twelfth aspect of the present invention is the handle knob according to any of the eighth through eleventh aspects of the present invention, in which the attachment member is formed such that the surface thereof on the opposite side of the handle arm side when mounted to the tubular portion will be positioned so as to be flush with the surface of the first knob on the opposite side of the handle arm, or will be positioned further toward the handle arm side than the surface of the first knob on the opposite side of the handle arm. In this situation, because the tip surface of the tubular portion is formed so as to be positioned flush with the surface of the first knob on the opposite side of the handle arm or formed so as to be positioned further toward the handle arm side than the surface of the first knob on the opposite side of the handle arm. In particular, because a conventional boss cannot be unitarily formed so as to have a large diameter on the outer periphery of the tip of the tubular portion when the tubular portion and the first knob are unitarily formed, the effects of the present invention become conspicuous.

The handle knob according to a thirteenth aspect of the present invention is the handle knob according to any of the seventh through twelfth aspects of the present invention, in which the first knob has a first separate member connected to the tubular portion and a second separate member detachably attached to the first separate member on the opposite side of the handle arm.

The handle knob is formed with a tubular portion and three members. The three members are the first separate member, the second separate member, and the second knob arranged on the outer periphery of the tubular portion. Here, because for example at least one of the first separate member, second separate member and the second knob are formed from a synthetic resin, and the remaining members amongst the first separate member, the second separate member and the second knob are formed from a metal, the overall weight is reduced by the member being made of synthetic resin. The attractiveness of the outer appearance is maintained at a high level by the members being made of metal. In addition, because the first separate member and the second knob are formed from the same material, the first separate member, which is in contact with the fingertips, and the second knob, which is in contact with the palm, provide the same feeling when the handle knob is grasped. Thus, the feeling when the handle knob is grasped is improved.

The handle knob according to a fourteenth aspect of the present invention is the handle knob of the thirteenth aspect of the present invention, in which the second separate member is formed from a material that is different from either the first separate member or the second knob. In this situation, because the second separate member is formed from a synthetic resin and the first separate member and the second knob are formed from a metal, the overall weight is reduced by means of the second knob made of synthetic resin. The attractiveness of the outer appearance is maintained at a high level by the first separate member and the second knob being made of metal.

The handle knob according to a fifteenth aspect of the present invention is the handle knob of the thirteenth or fourteenth aspect of the present invention, in which the first separate member is formed from the same material as the second knob. In this situation, because the first separate member, which is in contact with the fingertips, and the second knob, which is in contact with the palm, will have the same feeling when the handle knob is grasped by forming the first separate member and the second knob from the same material. Thus, the feeling when the handle knob is grasped is improved.

The handle knob according to a sixteenth aspect of the present invention is the handle knob of the fifteenth aspect of the present invention, in which the second knob is screwed to the first separate member by a plurality of screw members inserted from outside of the outer peripheral surface of the second knob, and the second separate member is sandwiched between the first separate member and the second knob. In this situation, by sandwiching the second separate member between the first separate member and the second knob, it is no longer necessary to machine a mounting portion for mounting the first separate member or the second knob to the second separate member. Thus, the formation of the second separate member becomes easier.

The handle knob according to a seventeenth aspect of the present invention is the handle knob of any of first through sixteenth aspects of the present invention, in which the handle knob is attached to the knob shaft fixed on the tip of the handle arm of a spinning reel for the fishing reel. In this situation, the ability of the handle knob of the spinning reel to be grasped is improved.

The handle knob according to an eighteenth aspect of the present invention is the handle knob of any of the first through sixteenth aspects of the present invention, in which the handle knob is attached to the knob shaft fixed on the tip of the handle arm of a dual bearing reel for the fishing reel. In this situation, the ability of the handle knob of the dual bearing reel to be grasped is improved.

A handle assembly according to a nineteenth aspect of the present invention is a handle assembly mounted on the tip of a handle shaft of a fishing reel that includes a handle arm with a base end that is mounted on the tip of the handle shaft and extends in a direction that is perpendicular to the handle shaft, a knob shaft that is fixed to the tip of the handle arm and extends in a direction along the handle shaft, and a handle knob rotatively mounted on the knob shaft according to any of the first through eighteenth aspects of the present invention. In this situation, the ability to grasp the handle knob is improved with a handle assembly that includes the handle knob of any of the first through eighteenth aspects of the present invention.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
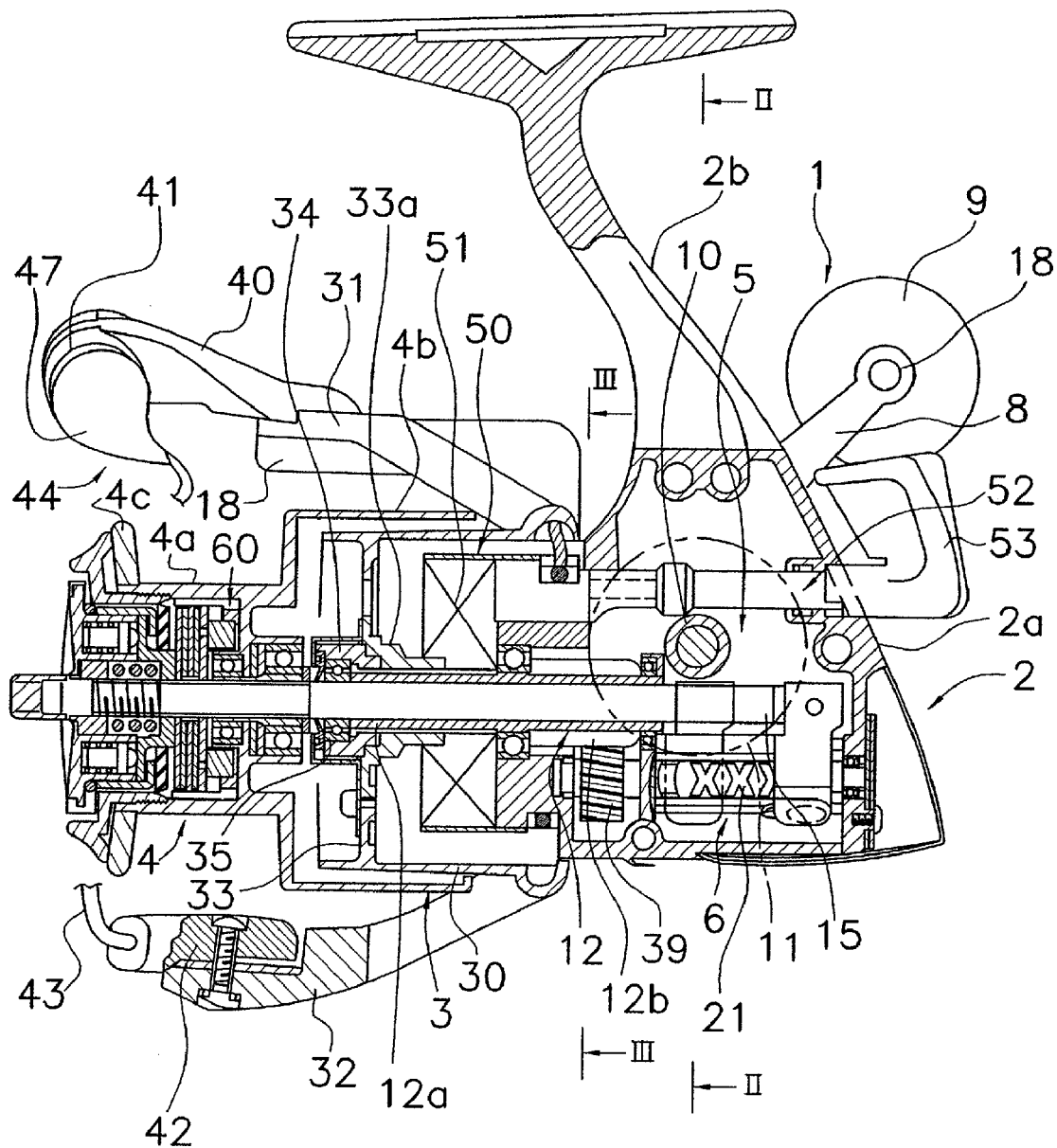
FIG. 1 is a side cross sectional view of a spinning reel with a handle assembly in accordance with a first embodiment of the present invention.

Referring initially to FIG. 1, a spinning reel is illustrated in accordance with a first embodiment of the present invention. The spinning reel includes a handle assembly 1, a reel unit 2 that rotatively supports the handle assembly 1, a rotor 3 and a spool 4. The handle assembly 1 is exchangeably mounted on one of two sides of the reel unit 2. For example, the handle assembly 1 is mounted on the right side of the reel unit 2 in FIG. 1 and is mounted on the left side of the reel unit 2 in FIGS. 2 and 4. The rotor 3 is rotatively supported on a front portion of the reel unit 2. Fishing line is wound around an outer peripheral surface of the spool 4. The spool 4 is disposed on a front portion of the rotor 3 such that the spool 4 moves forward and backwards.

Figure 2:
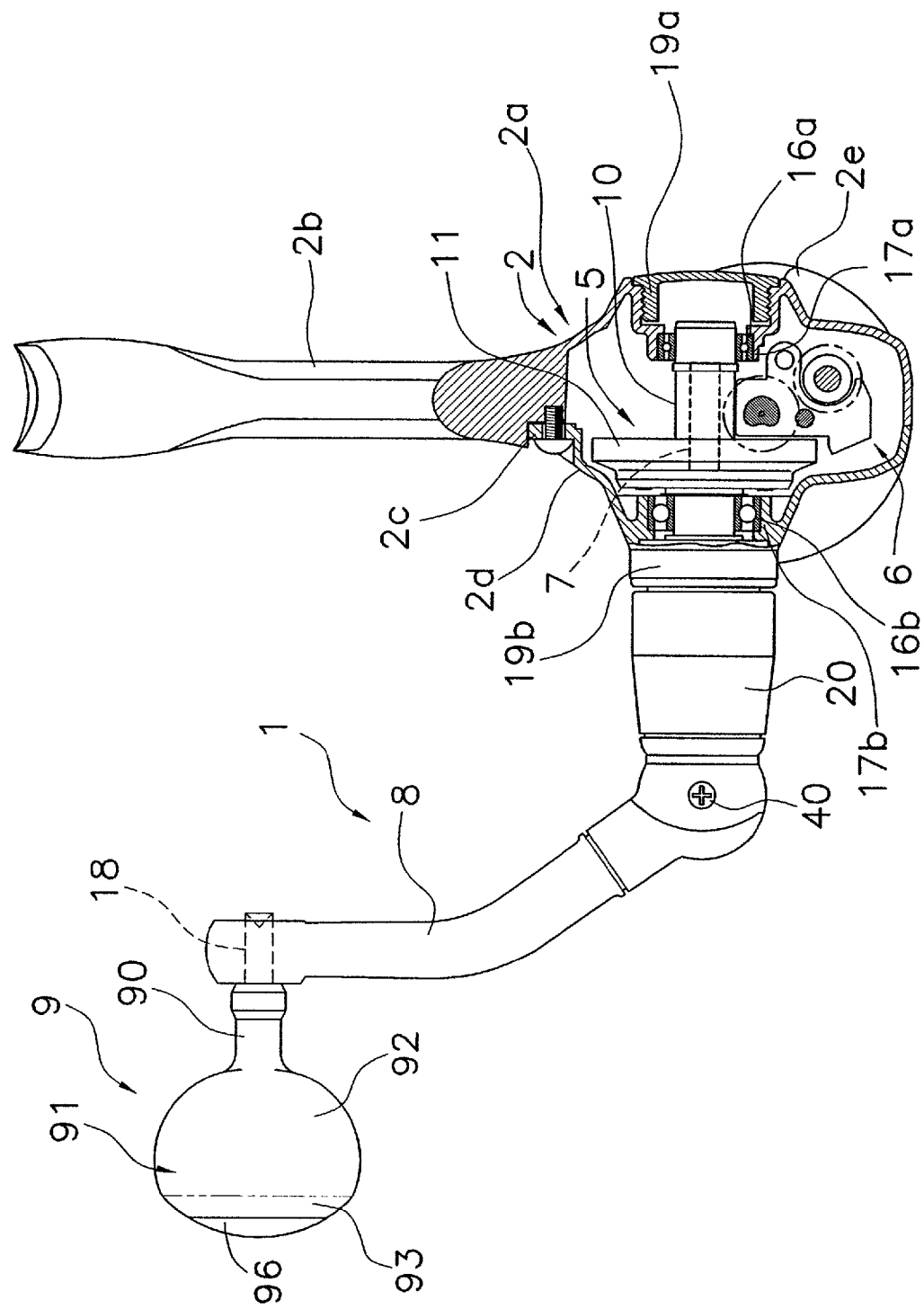
FIG. 2 is the cross sectional view II-II of FIG. 1 of the spinning reel with the handle assembly in accordance with the first embodiment of the present invention.

As shown in FIG. 2, the handle assembly 1 includes a handle arm 8, a handle knob 9 and a knob shaft 18. The handle knob 9 is mounted on a tip of the handle arm 8. The handle knob 9 is rotatably mounted on the knob shaft 18.

As shown in FIGS. 2 and 5-7, the handle knob 9 has a tubular portion 90 and a substantially spherical knob portion 91. The tubular portion 90 is mounted on an outer peripheral surface of the knob shaft 18. The knob portion 91 is unitarily formed with the tubular portion 90. The knob portion 91 has an outermost radial portion 85, a first knob 92 and a second knob 93. The first knob 92 is disposed on a side of the knob portion 91 closest to the handle arm 8. An outer peripheral surface of the first knob 92 is formed in a substantially spherical shape. The second knob 93 is disposed on a side of the first knob opposite a handle arm side or the tubular portion 90. An outer peripheral surface of the second knob 93 is formed into a substantially spherical shape that has a larger diameter than a diameter of the first knob 92. The second knob 93 is unitarily linked with the first knob 92 at a junction 84 a distance from the outermost radial portion 85 at a region of the knob portion 91 opposite the tubular portion 90.

Figure 5:
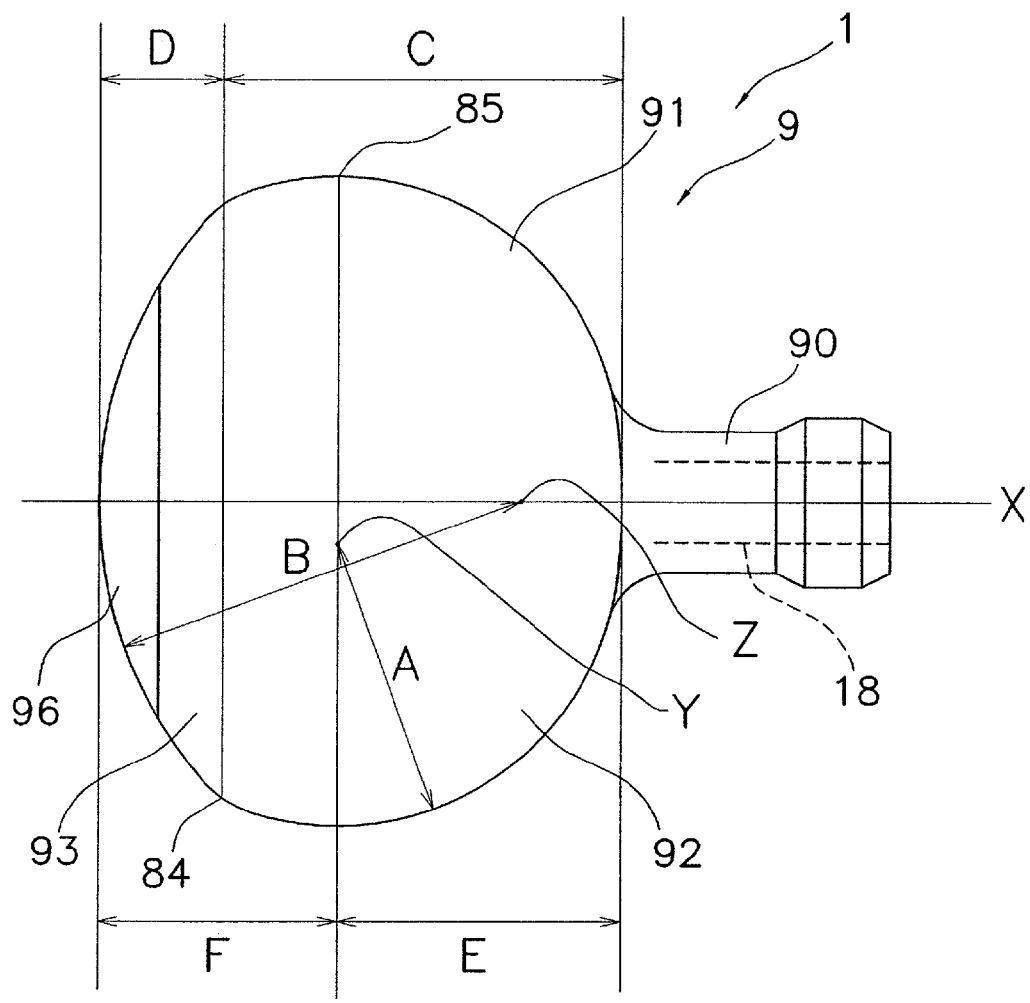
FIG. 5 is an enlarged side view of a handle knob of the handle assembly illustrated in FIG. 2 in accordance with the first embodiment of the present invention.
Figure 6:
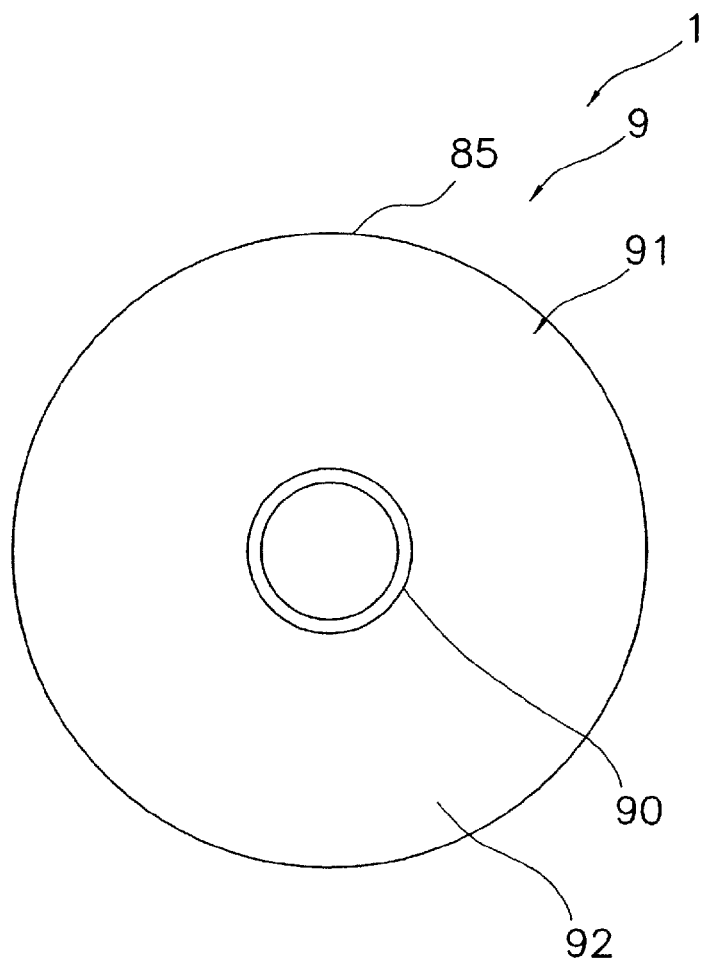
FIG. 6 is a handle arm side elevational view of the handle knob of the handle assembly illustrated in FIG. 2 in accordance with the first embodiment of the present invention.
Figure 8:
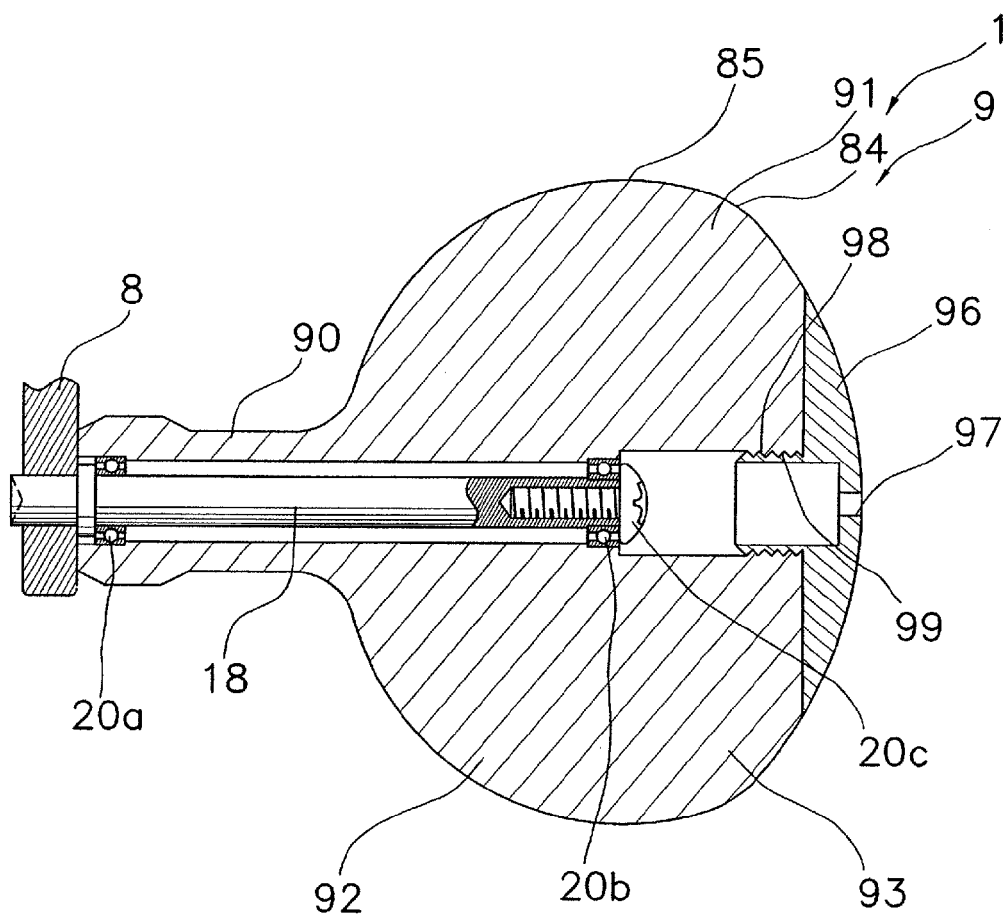
FIG. 8 is a side cross sectional view of the handle knob of the handle assembly illustrated in FIG. 2 in accordance with the first embodiment of the present invention.

As shown in FIGS. 5 and 6, the tubular portion 90 is a tubular member which is open on a handle arm side of the tubular portion 90. The tubular portion 90 is unitarily formed with the knob portion 91 by machining metal such as brass or the like. Referring to FIG. 8, inner peripheral portions of the tubular portion 90 and the knob portion 91 are rotatably supported via first and second bearings 20a and 20b on the outer peripheral surface of the knob shaft 18. As shown in FIG. 8, a handle arm end of the knob shaft 18 is deformed so as to be retained on the tip of the handle arm 8. A tip of the knob shaft 18 retains the tubular portion 90 and the knob portion 91 by means of a screw member 20*c*. The handle arm side of the tubular portion 90 has a larger diameter than other portions of the tubular portion 90.

Figure 7:
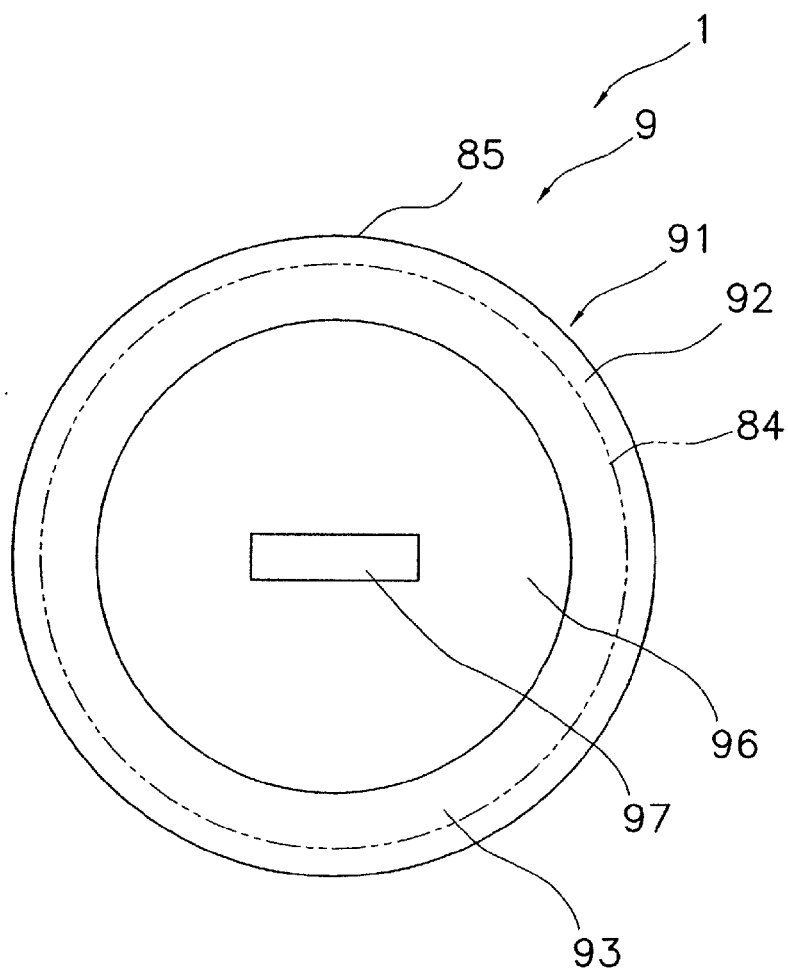
FIG. 7 is a grasp side elevational view of the handle knob of the handle assembly illustrated in FIG. 2 in accordance with the first embodiment of the present invention.

As shown in FIGS. 5 and 8, the knob portion 91 is unitarily formed with the tubular portion 90 by machining metal such as brass or the like. The knob portion 91 has a substantially spherical shape that is axially symmetrical with respect to an axis X of the knob shaft 18. Axis X runs through the center of the tubular portion and the knob shaft 18 in an axial direction. As shown in FIGS. 5 and 7, the knob portion 91 has a substantially circular shape on the side opposite the handle arm 8. A lid member 96 made of a synthetic resin is mounted on the knob portion 91 on the side opposite the handle arm 8. The knob portion 91 further has an opening, which is closed by the lid member 96. A female threaded portion 99 is formed in an inner peripheral portion of the opening of the knob portion 91. As shown in FIGS. 7 and 8, the lid member 96 has a rectangular opening in a central portion that forms an operation recess 97. The operation recess 97 is rotatably operated with a coin or the like. As shown in FIG. 8, a male threaded portion 98 is formed on a side of the lid member 96 closest to the handle arm 8. The male threaded portion 98 engages with the female threaded portion 99. By rotatably operating the operation recess 97 with a coin or the like, the male threaded portion 98 engages with the female threaded portion 99, thereby detachably fixing the lid member 96 to the knob portion 91. The outer shape of the lid member 96 is smoothly and continuously linked with the second knob 93 of the knob portion 91 such that the outer shape of the lid member 96 follows the same slope and contour as the outer shape of the second knob 93.

As shown in FIG. 5, the first knob 92 is formed into a substantially spherical shape that is axially symmetrical with respect to the axis X of the knob shaft 18. The second knob 93 is formed into a substantially spherical shape that is axially symmetrical with respect to the axis X of the knob shaft 18 and unitarily linked with the first knob 92. The outer shape of the first knob 92 is formed by a curved surface that is an arc (radius A) centered on a position (center Y) that is offset from the axis X of the knob shaft 18 and rotated around the axis X of the knob shaft 18. The outer shape of the second knob 93 is formed by a spherical surface that is an arc (radius B) centered on a position (center Z) that is concentric with the axis X of the knob shaft 18, deflected on the handle arm side and rotated around the knob shaft 18. The center Y of the arc is positioned in the same position as the outermost radial portion 85 of the first knob 92. The center Z of the arc is positioned on the first knob 92. The radius B of the second knob 93 is larger than the radius A of the first knob 92.

The center Y may also be in a position different than the outermost radial portion 85 or may be concentric with the axis X of the knob shaft 18. In addition, the radius A of the first knob 92 and the radius B of the second knob 93 are not limited to the aforementioned dimension of radius B of the second knob 93>the radius A of the first knob 92. In addition, each dimension of the tubular portion 90 and the knob portion 91 is not limited to the aforementioned dimensions.

As shown in FIG. 5, a length C in the axial direction between an end portion of the first knob 92 and the junction 84 is longer than a length D in the axial direction between an end portion of the second knob 93 and the junction 84. In addition, a length E in the axial direction between an end portion of the first knob 92 and the outermost radial portion 85 of the first knob 92 is longer than a length F in the axial direction between an end portion of the second knob 93 and the outermost radial portion 85 of the first knob 92. The end portion of the second knob 93 and the outermost radial portion 85 of the first knob 92 are disposed nearby each other. The handle knob 9 is formed so that the overall length in the axial direction is about 50 mm to 70 mm and preferably about 56 mm.

The length in the axial direction of tubular portion 90 is about 15 mm to 25 mm and preferably about 19 mm. The outer diameter of the tubular portion 90 is about 3 mm to 7 mm and preferably about 5 mm.

The knob portion 91 is formed so that the length in the axial direction is about 35 mm to 45 mm and preferably about 37 mm. The knob portion 91 is longer than an exteriorly exposed length of the tubular portion 90. The length in the radial direction of the junction 84 is about 15 mm to 25 mm and preferably about 21 mm. The length in the radial direction of the outermost radial portion 85 of the first knob 92 is about 15 mm to 25 mm and preferably about 23 mm. The length in the radial direction of the outermost radial portion 85 is longer than the length in the radial direction of the junction 84 of the first knob 92 and the second knob 93.

The radius A of the arc that produces the outer shape of the first knob 92 is about 15 to 25 mm and preferably about 20 mm. The radius B of the arc that produces the outer shape of the second knob 93 is about 25 mm to 35 mm and preferably about 30 mm. The length in the radial direction that the center Y is positioned from the axis X is about 1 mm to 5 mm and preferably about 3 mm. The length in the axial direction from the outermost radial portion 85 to the center Z is about 10 mm to 15 mm and preferably about 13 mm. The center Z is positioned such that it is offset on a tubular portion side.

The first knob 92 is formed so that the length C in the axial direction is about 25 mm to 35 mm and preferably about 28 mm. The second knob 93 is formed so that the length D in the axial direction is about 5 mm to 15 mm and preferably about 9 mm. The length D is shorter than the length C in the axial direction of the first knob 92. The length E is about 15 mm to 25 mm and preferably about 20 mm. The length F is about 15 mm to 25 mm and preferably about 17 mm. The length F is shorter than the length E. The length in the axial direction between the junction 84 and the second knob 93 and the outermost radial portion 85 of the first knob 92 (i.e., F-D or C-E) is about 5 mm to 15 mm and preferably about 8 mm.

Referring to FIGS. 1 and 2, the reel unit 2 has a reel body 2*a* with an opening 2*c*, a T-shaped rod attachment leg 2*b* and a cover 2*d*. The rod attachment leg 2*b* extends diagonally upward and forward from the reel body 2*a*. The cover 2*d* is for closing the opening 2*c* in the reel body 2*a*.

Figure 3:
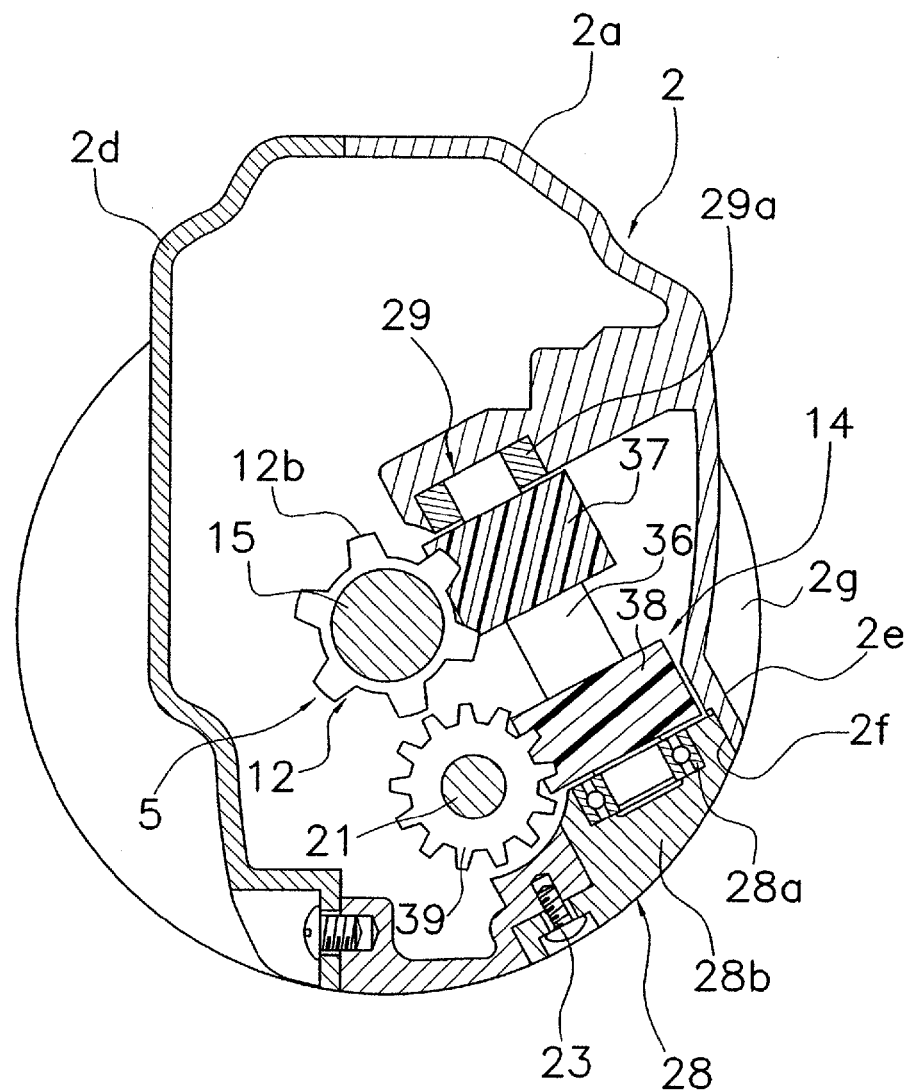
FIG. 3 is the cross sectional view III-III of FIG. 1 of the spinning reel with the handle assembly in accordance with the first embodiment of the present invention.

As shown in FIGS. 2 and 3, the reel body 2*a* has an interior space having a rotor drive mechanism 5 and an oscillating mechanism 6. The rotor drive mechanism 5 rotates the rotor 3 in association with the rotation of the handle assembly 1. The oscillating mechanism 6 moves the spool 4 back and forth and uniformly winds the fishing line.

As shown on the right side of the reel body 2*a* in FIG. 2, a tubular first boss 17*a* is formed. The first boss 17*a* is formed to project inwardly in order to accommodate a third bearing 16*a*. A second boss 17*b* is formed in a position that faces the first boss 17*a*. The second boss 17*b* is formed to project inwardly in order to accommodate a fourth bearing 16*b*. The first boss 17*a* is covered by a shaft cover 19*a*. The second boss 17*b* is protected against the intrusion of water by means of a perforated cover 19*b*. The shaft cover 19*a* and the perforated cover 19*b* are circular members and are screwed onto their respective first and second bosses 17*a* and 17*b*.

The reel unit 2 further includes a bulge 2e for accommodating a rotation transmission mechanism 14. The bulge 2e is formed in front of the first boss 17a. The bulge 2e is formed diagonally so that it gradually projects toward the bottom of FIG. 2. The rotation transmission mechanism 14 includes a first bearing unit 28 and a second bearing unit. The first bearing unit 28 is detachably mounted on a lower end of the bulge 2e. The second bearing unit 29 projects inwardly and is formed on a base end of the bulge 2e.

As shown in FIGS. 1 and 2, the rotor drive mechanism 5 has a handle shaft 10 to which the handle assembly 1 is non-rotatably mounted, a face gear 11 that rotates together with the handle shaft 10 and a pinion gear 12 that meshes with the face gear 11. Both ends of the handle shaft 10 are rotatably supported by the reel body 2a and the cover 2d via the third and fourth bearings 16a and 16b.

The oscillating mechanism 6 serves to move a spool shaft 15 fixed to the center of the spool 4 forward and backward in association with the rotor 3, and thereby move the spool 4 in the same direction. The rotation of the handle assembly 1 is transmitted to the oscillating mechanism 6 via the rotation transmission mechanism 14.

Figure 4:
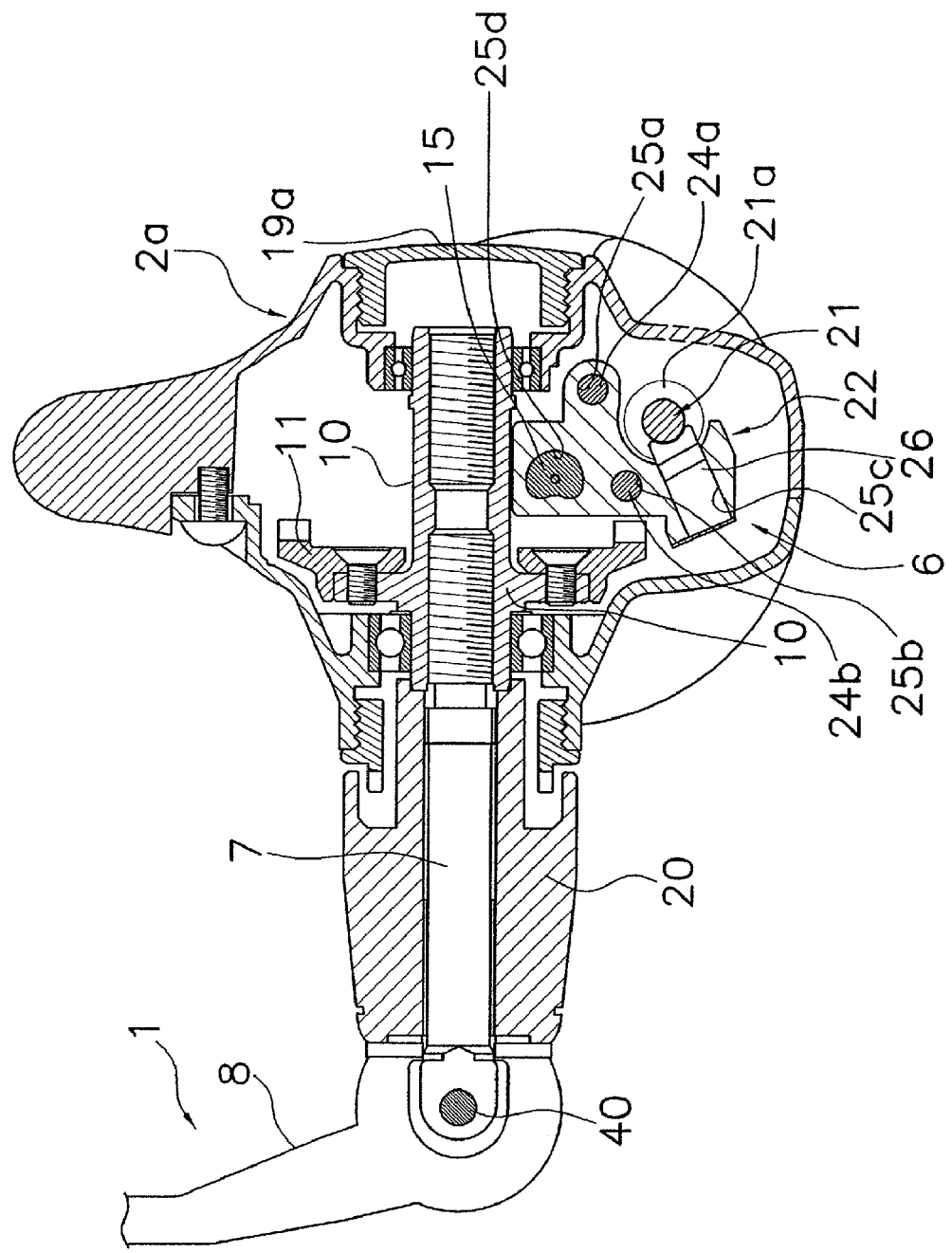
FIG. 4 is a cross sectional view along a longitudinal axis of a handle shaft of the handle assembly illustrated in FIG. 2 in accordance with the first embodiment of the present invention.

As shown in FIGS. 1, 2, and 4, the oscillating mechanism 6 has a worm shaft 21 disposed beneath the spool shaft 15, a slider 22 that moves forward and backward along the worm shaft 21 and two guide shafts 24a and 24b that guide the slider 22. The worm shaft 21 is disposed parallel to the spool shaft 15 and is rotatively supported by the reel body 2a. In addition, spiral intersecting grooves 21a are formed around the outer peripheral portion of the worm shaft 21.

The slider 22 has a slider unit 25 and an engagement member 26 that is accommodated inside the slider unit 25. The slider unit 25 is made, for example, from die cast aluminum and has guide holes 25a and 25b, an engagement hole 25c and a mounting hole 25d. The slider unit 25 is guided parallel to the spool shaft 15 by means of the guide shafts 24a and 24b. The guide shafts 24a and 24b pass through the guide holes 25a and 25b. The engagement member 26 is mounted in the engagement hole 25c. The spool shaft 15 is non-rotatably mounted in the mounting hole 25d.

The spool shaft 15 and the mounting hole 25d have a substantially semi-circular cross-section. The spool shaft 15 is fixed to the slider unit 25 by means of a screw (not shown). In this way, the forward and backward movement of the slider 22 is transmitted to the forward and backward movement of the spool shaft 15 and the spool 4. In addition, the rotation of the spool shaft 15 is stopped when the drag for the spool 4 is operated.

The engagement member 26 is rotatively mounted inside the engagement hole 25c. A tip of the engagement member 26 meshes with the grooves 21a of the worm shaft 21. The meshing allows the slider 22 to reciprocally move forward and backward in the spool shaft direction when the worm shaft 21 rotates.

As shown in FIGS. 3 and 4, the rotation transmission mechanism 14 further includes a linking shaft 36, the first bearing unit 28, which rotatably supports the lower end of the linking shaft 36, the second bearing unit 29, which rotatably supports the upper end of the linking shaft 36, and first, second and third gears 37, 38 and 39. The pinion gear 12 has a gear component 12b composed of a screw gear on the rear portion thereof. The gear component 12b meshes with the face gear 11.

The linking shaft 36 is disposed diagonally along an axis that is skewed to the pinion gear 12 so as to allow the linking shaft 36 to be linked to the worm shaft 21. The linking shaft 36 is disposed on the inside of the bulge 2e. More specifically, the linking shaft 36 is tilted with respect to the plane intersecting the handle shaft 10 so that it forms an axial intersection angle of 90 degrees to the pinion gear 12 and to the worm shaft 21. In other words, the linking shaft 36 is disposed so that it is tilted diagonally in the horizontal (left to right) direction and the vertical (up and down) direction with respect to the reel unit 2. Thus, by disposing the linking shaft 36 diagonally, the reel unit 2 is more compact, while maintaining a good balance in size in the horizontal and vertical directions.

The first gear 37 is a screw gear that meshes with the gear component 12b of the pinion gear 12 at a plane on the opposite side from where the face gear 11 meshes. The first gear 37 is non-rotatably fixed to the linking shaft 36. The second gear 38 is a worm gear and is arranged on the linking shaft 36 so as to be spaced apart from the first gear 37. The second gear 38 is unitarily formed with the linking shaft 36. The third gear 39 is a worm gear that meshes with the second gear 38 and is non-rotatably fixed to the front end of the worm shaft 21.

The first bearing unit 28 is detachably mounted on the lower surface of the bulge 2e. The first bearing unit 28 is fixed to the bulge 2e by means of a screw 23. The first bearing unit 28 has a fifth bearing 28a and the second bearing unit 29 has a sixth bearing 29a. The fifth and sixth bearings 28a and 29a rotatably support the linking shaft 36.

As shown in FIG. 1, the rotor 3 includes a cylindrical portion 30 and first and second rotor arms 31 and 32. The first and second rotor arms 31 and 32 are arranged opposite to each other on the cylindrical portion 30. The cylindrical portion 30, the first rotor arm 31, and the second rotor arm 32 are unitarily formed together.

The reel unit further includes a through hole 2f and a flange 2g. The flange 2g is formed at the front part of the reel body 2a so as to be covered by a rear end of the cylindrical portion 30 of the rotor 3. The through hole 2f has an inner peripheral surface with a diameter larger than a maximum outside diameter of the second gear 38. The first bearing unit 28 further has a cover member 28b detachably mounted on the reel body 2a to the rear of the flange 2g. The through hole 2f is formed in the bottom of the reel body 2a in a mounting portion of the cover member 28b. The cover member 28b is fitted into the through hole 2f. The cover member 28b is fixed to the reel body 2a by the screws 23.

Referring to FIG. 1, a front wall 33 is formed on a front of the cylindrical portion 30. A rotor boss 33a is formed in the central portion of the front wall 33. The front portion 12a of the pinion gear 12 and the spool shaft 15 pass through a rotor through hole in the rotor boss 33a. A nut 34 is disposed on the front side of the front wall 33. The nut 34 is threaded onto a threaded portion on the tip of the pinion gear 12. A rotor bearing 35 that serves to rotatively support the nut 34 with respect to the spool shaft 15 is disposed in the interior of the nut 34.

A bail arm 44 is mounted on tips of the first and second rotor arms 31 and 32 so as to be pivotable between a line winding position and a line release position. The bail arm 44 has first and second bail support members 40 and 42, a fixed shaft cover 47, a line roller 41 and a bail 43. The first and second bail support members 40 and 42 are pivotably mounted on an inside of the tips of the first and second rotor arms 31 and 32. The fixed shaft cover 47 includes a fixed shaft fixed at the base of the tip of the first bail support member 40. The line roller 41 guides the fishing line to the spool 4. As shown in FIG. 1, the first bail support member 40 is pivotably mounted on the outer side of the tip of the first rotor arm 31. The second bail support member 42 is pivotably mounted on the inner side of the tip of the second rotor arm 32. The bail 43 links the fixed shaft cover 47 and the second bail support member 42

A reverse rotation prevention mechanism 50 of the rotor 3 is disposed inside the cylindrical portion 30. The reverse rotation prevention mechanism 50 includes a roller-type one-way clutch 51 and an operation mechanism 52 for switching the one-way clutch 51 between an operating state and a non-operating state. The one-way clutch 51 has an outer ring fixed to the reel body 2a and an inner ring non-rotatively mounted to the pinion gear 12. The operation mechanism 52 has an operation lever 53 disposed on the rear of the reel body 2a. The one-way clutch is switched between the operating state and the non-operating state by pivoting the operation lever 53. In the operating state, the rotor 3 cannot rotate in the reverse direction. In the non-operating state, the rotor 3 is able to rotate in the reverse direction.

The spool 4 is disposed between the first rotor arm 31 and the second rotor arm 32 of the rotor 3. The spool 4 is fixed to the front end of the spool shaft 15 via a drag mechanism 60. The spool 4 has a bobbin 4a, a skirt 4b and a front flange 4c. The fishing line is wound around an outer periphery of the bobbin 4a. The skirt 4b is integrally formed at the rear of the bobbin 4a. The front flange 4c is fixed to the front of the bobbin 4a. The bobbin 4a is a cylindrical member that extends to the outer peripheral sides of the cylindrical portion 30 of the rotor 3. The skirt 4b and the front flange 4c extend perpendicularly and radially outward from both ends of the bobbin 4a. As a result, when the fishing line is wound around the bobbin 4a of the spool 4, the number of coils of fishing line is substantially equal at each line winding stage.

Next, the operation and movement of the reel will be described.

When casting with the spinning reel, the bail arm 44 is pushed over from the line winding position to the line release position. Thus, the first bail support member 40 and the second bail support member 42 pivot.

When the fishing line is to be wound onto the spool 4, the bail 44 is returned to the line winding position. This is performed automatically by means of the movement of a cam and a spring (not shown) when the handle assembly 1 is rotated in the line winding direction. When the handle assembly 1 is rotated in the line winding direction, rotational force is transmitted to the pinion gear 12 via the handle shaft 10 and the main gear 11. The rotational force transmitted to the pinion gear 12 is transmitted to the rotor 3 via the front portion of the pinion gear 12 and the rotor 3 rotates in the line winding direction.

Thus, when the handle assembly 1 is to be rotated, particularly when jigging is to be performed, the entire handle knob 9 is firmly grasped with the palm.

Here, because the outer peripheral surface of the second knob 93 of the handle knob 9 is formed into a substantially spherical shape, it is difficult for a gap to be produced between the palm and the end of the second knob 93 when firmly grasping the entire handle knob 9 with the palm. Thus, the ability to grasp the handle knob 9 is improved.

In addition, because the second knob 93 is formed in a substantially spherical shape with a diameter that is larger than a diameter of the first knob 92 (i.e., the radius B of the second knob 93>the radius A of the first knob 92), and is linked in a position on the opposite side of the outermost radial portion 85 from the handle arm 8 (i.e., the junction 84 is a distance from the outermost radial portion 85 at a region of the knob portion 91 opposite the tubular portion 90), the outermost radial portion 85 is arranged in a position closer to the palm than when the junction 84 and the outermost radial portion 85 of the first knob 92 and the second knob 93 are the same. Thus, because trunks of the fingers are placed on the outermost radial portion 85 when the handle knob 9 is grasped, the ability to grasp the handle knob 9 is improved.

The configuration of the spinning reel is not limited to the above embodiment, and the present invention can also be applied to a spinning reel that has no drag mechanism, or has one on the rear thereof, or one in which a brake mechanism having a brake lever is mounted instead of the reverse rotation prevention mechanism. In addition, the present invention can be applied to a handle for a low profile type of bait reel or a round-type dual bearing reel, rather than a spinning reel.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention and relative to the view of the angler standing behind the reel unit 2.

Second Embodiment

Figure 9:
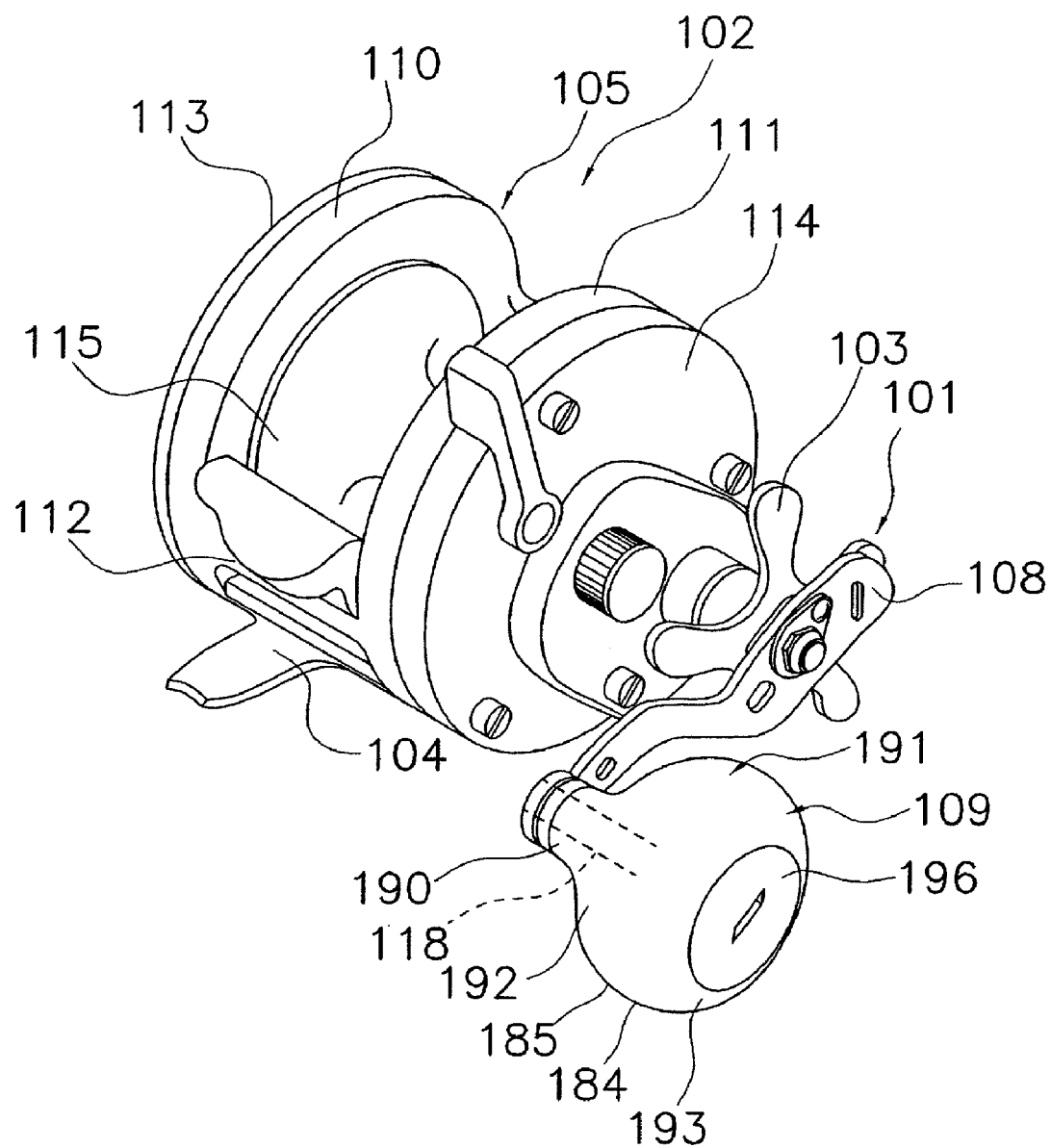
FIG. 9 is a perspective view of a dual bearing reel with a handle assembly in accordance with a second embodiment of the present invention.

Referring now to FIG. 9, a dual bearing reel in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

The second embodiment has a single handle type round reel that includes a reel unit 101, a handle assembly 102 and a star drag 103. The handle assembly 102 is disposed on a side of the reel unit 101 and serves to rotate a spool 115. The star drag 103 is disposed on a side of the handle assembly 102 closest to the reel unit 101.

The spool 115 winds up or releases fishing line. The spool 115 is rotatively mounted on the reel unit 1. The reel unit 1 is attached to a fishing rod with a rod attachment leg 104. The reel unit 101 has a frame 105 having a first side plate 110 and a second side plate 111. The first and second side plates 110 and 111 are disposed from left to right so as to have a predetermined gap therebetween. The frame 105 further has a plurality of connection members 112, first and second side covers 113 and a mechanism mounting plate 116 mounted on the second side cover 114. The connection members 112 connect the first side plate 110 and the second side plate 111. Each of the first and second side covers 113 and 114 is mounted on a respective side of the frame 105.

The handle assembly 102 has a handle arm 108, a knob shaft 118 and a handle knob 109. The handle arm 108 is non-rotatably mounted to a tip of a handle shaft. The knob shaft 118 is screwed to the tip of the handle arm 108. The handle knob 109 is rotatively mounted on the knob shaft 118.

The handle knob 109 has a tubular portion 190 and a substantially spherical knob portion 191. The tubular portion 190 is mounted on an outer peripheral side of the knob shaft 118. The knob portion 191 is unitarily formed with the tubular portion 190. The knob portion 191 has a first knob 192 and a second knob 193. The first knob 192 is disposed on a side of the knob portion 191 closest to the handle arm 108. An outer peripheral surface of the first knob 192 is formed into a substantially spherical shape. The second knob 193 is disposed on a side of the first knob that is opposite the handle arm 108. An outer peripheral surface of the second knob 193 is formed into a substantially spherical shape that has a larger diameter than a diameter of the first knob 192. The first knob 192 and the second knob 193 are unitarily linked at a junction 184.

Here, like with the aforementioned embodiment, because the outer peripheral surface of the second knob 193 is formed in a substantially spherical shape, the palm is placed on the handle knob 109 to firmly grasp the same. Thus, the ability to grasp the handle knob 109 is improved. In addition, because the second knob 193 is formed in a substantially spherical shape whose diameter is larger than the first knob 192, and is linked in a position on the opposite side of the handle arm 108 from the outermost radial portion 185, the outermost radial portion 185 of the first knob 192 is arranged in a position near the palm. Thus, due to differences in finger lengths, it is difficult for the ability to grasp the handle knob 109. Thus, the ability to grasp the handle knob 109 is improved.

Third Embodiment

Figure 10:
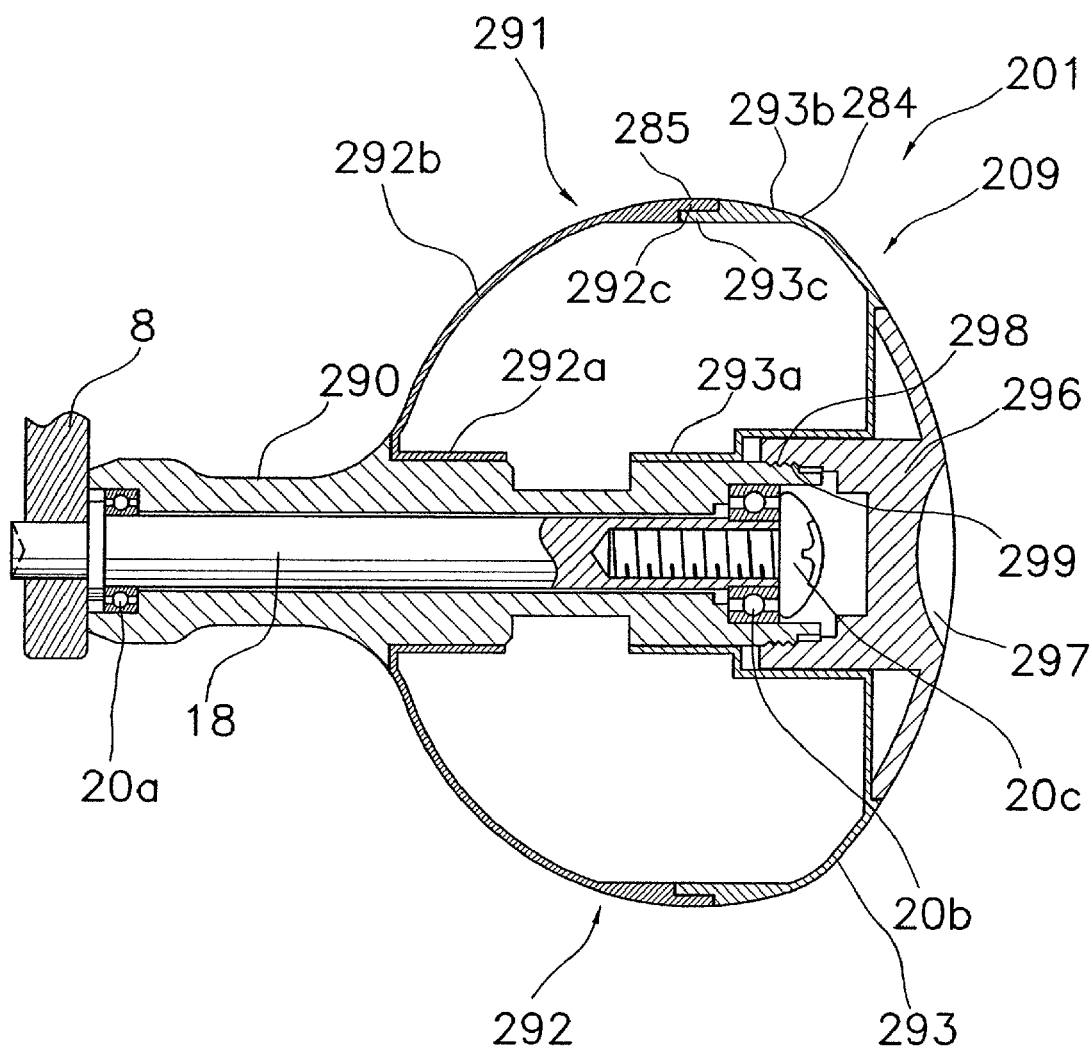
FIG. 10 is a side cross sectional view of a handle knob of a handle assembly in accordance with a third embodiment of the present invention.

Referring now to FIG. 10, a spinning reel in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the first embodiment, the knob portion 91 is unitarily formed with the tubular portion 90. However, the tubular portion 90 and the knob portion 91 may also be formed separately. In addition, although the knob portion 91 is unitarily formed with the tubular portion 90 by means of machining metal such as brass or the like, the knob portion 91 may also be made of a metal other than brass, or a synthetic resin instead of a metal. The third embodiment is essentially the same as the first embodiment except that a tubular portion 290 is formed separately from a knob portion 291.

As shown in FIG. 10, the tubular portion 290 and the lid member 296 may also be formed by made of an aluminum alloy. The knob portion 291 may also be made of a carbon fiber reinforced resin (CFRP). The knob portion 291 has a first knob 292 and a second knob 293 formed of CFRP. The first knob 292 is formed so as to have a space in the interior thereof. An outer peripheral surface of the first knob 292 is formed in a substantially hemispherical shape. The second knob 293 is formed so as to have a space in the interior thereof. An outer peripheral surface of the second knob 293 is formed in a substantially hemispherical shape. A diameter of the second knob 293 is larger than a diameter of the first knob 292.

The first knob 292 has a first cylindrical portion 292*a* on an inner peripheral portion, a first outer peripheral portion 292*b* and a first engagement portion 292*c*. The second knob 293 has a second cylindrical portion 293*a* on an inner peripheral portion, a second outer peripheral portion 293*b* and a second engagement portion 293*c*. The first and second cylindrical portions 292*a* and 293*a* are mounted and fixed to the first and second outer peripheral portions 292*b* and 293*b*, respectively. The first engagement portion 292*c* and the second engagement portion 293*c* mutually engage between the first outer peripheral portion 292*b* and the second outer peripheral portion 293*b*. The first and second engagement portions 292*c* and 293*c* are formed in an opening facing the first outer peripheral portion 292*b* and the second peripheral portion 293*b*. When the first engagement portion 292*c* and the second engagement portion 293*c* are engaged, the first outer peripheral portion 292*b* and the second peripheral portion 293*b* are smoothly continuous. The knob portion 291 has an outermost radial portion 285. The second peripheral portion 293*b* has a constructive junction 284 positioned on a side of the outermost radial portion 285 opposite the handle arm 108. A lid member 296 has an operation recess 297 that is formed in the center of the rear end thereof and which can be rotatively operated. The lid member 296 has a female threaded portion 299 that threads onto a male threaded portion 298. The male threaded portion 298 is formed on an outer peripheral portion of a tip of the tubular portion 290. The female threaded portion 299 is formed in an inner peripheral portion of a tip of the lid member 296. Here, by rotatively operating the operation recess 297, the female threaded portion 299 will screw onto the male threaded portion 298 and the lid member 296 will be detachably fixed to the knob portion 291.

The strength of the handle knob 209 is maintained at a high level while the overall weight of the handle knob 209 is reduced because the knob portion 291 is made of a carbon fiber reinforced resin with a space in the interior thereof.

Fourth Embodiment

Referring now to FIGS. 11-15, a spinning reel in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

Figure 11:
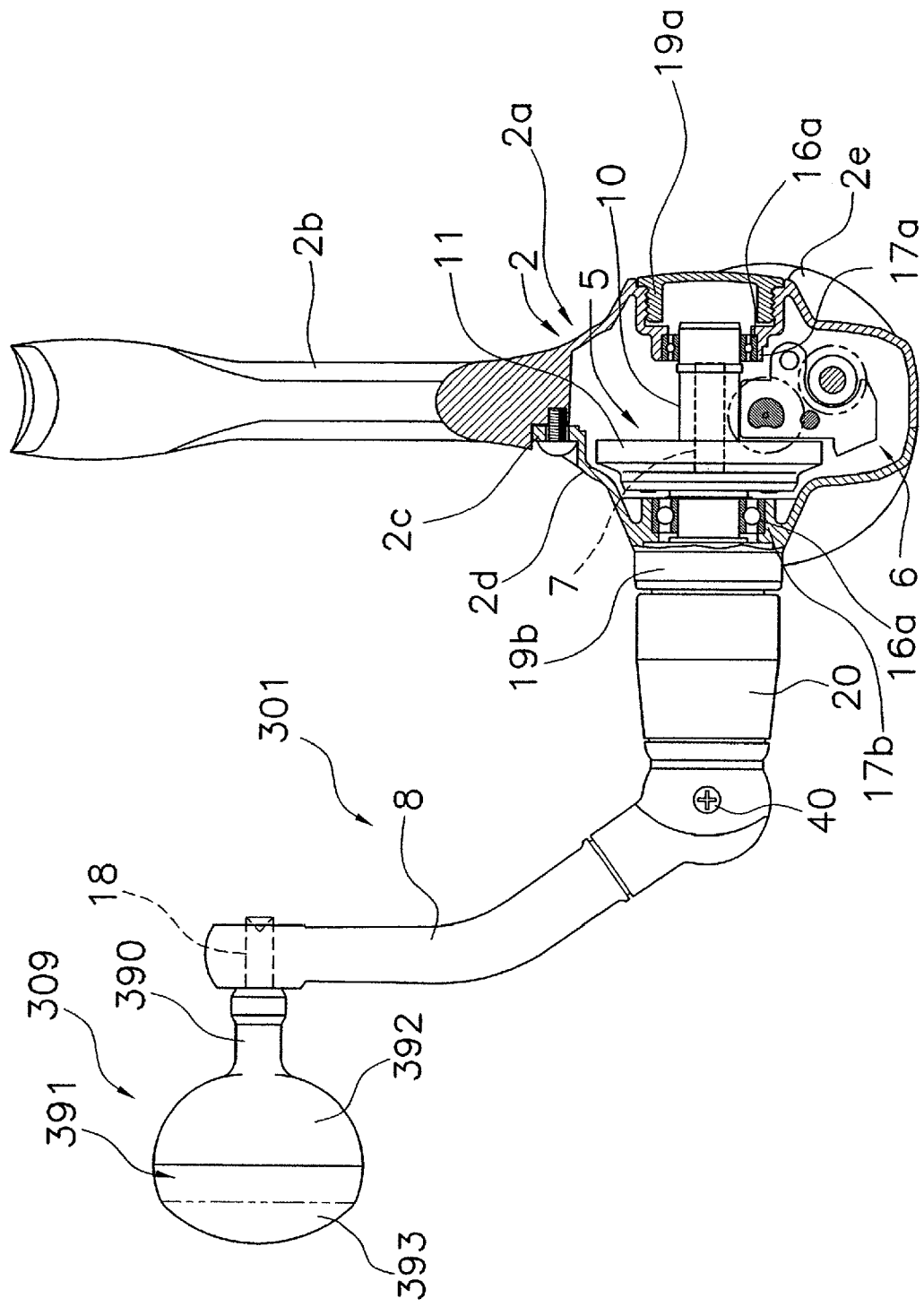
FIG. 11 is a side partial cross sectional view of a handle assembly in accordance with a fourth embodiment of the present invention.

As shown in FIG. 11, a handle assembly 301 according to a fourth embodiment of the present invention includes a handle knob 309 that is mounted on the tip of the handle arm 8. The handle knob 309 is rotatably mounted on the knob shaft 18.

As shown in FIGS. 11-15, the handle knob 309 has a tubular portion 390 that is mounted on the outer peripheral side of the knob shaft 18 and a substantially spherical knob portion 391 that is unitarily formed with the tubular portion 390.

Figure 12:
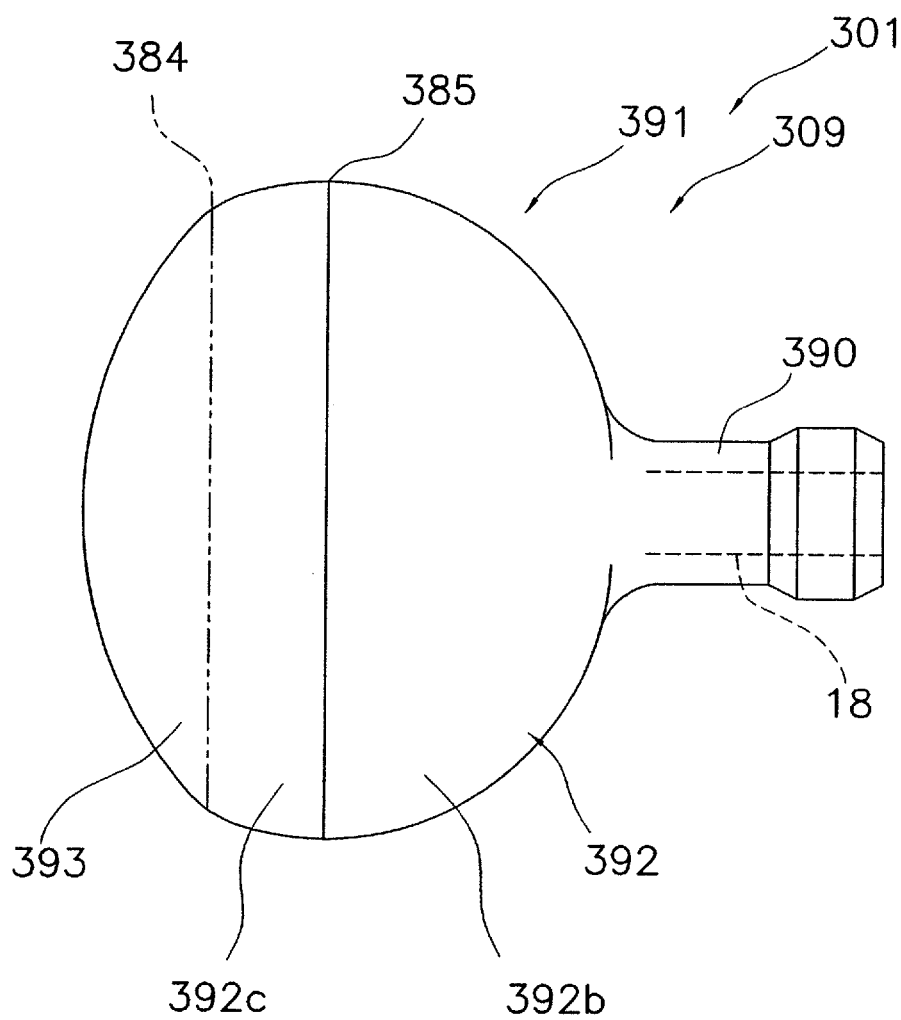
FIG. 12 is a side view of a handle knob of the handle assembly illustrated in FIG. 11 in accordance with the fourth embodiment of the present invention.
Figure 13:
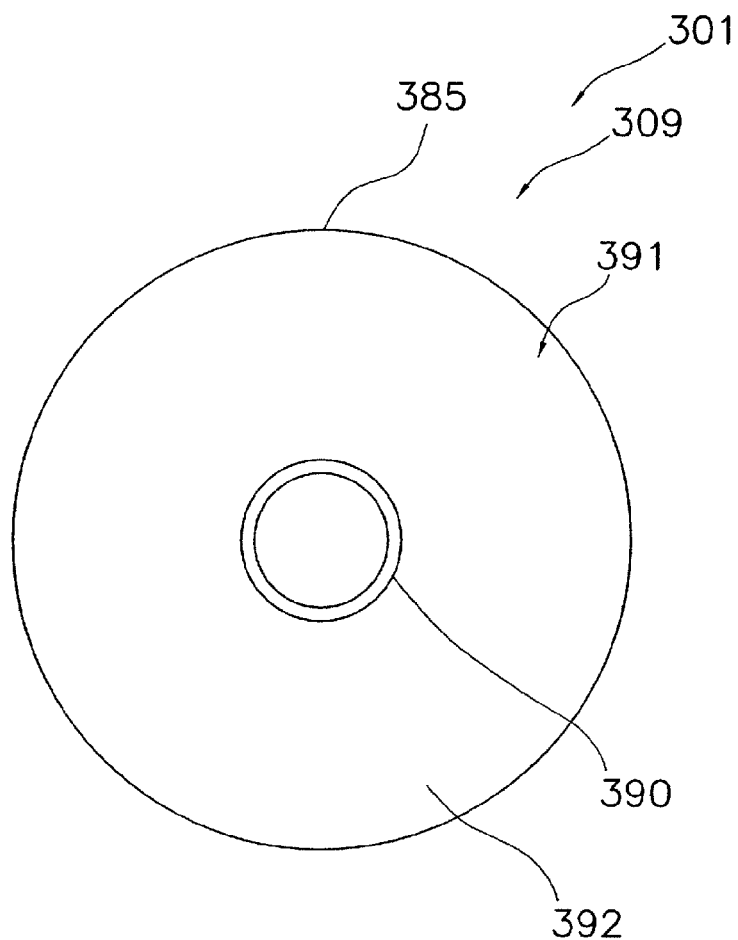
FIG. 13 is a handle arm side elevational view of the handle knob of the handle assembly illustrated in FIG. 11 in accordance with the fourth embodiment of the present invention.
Figure 15:
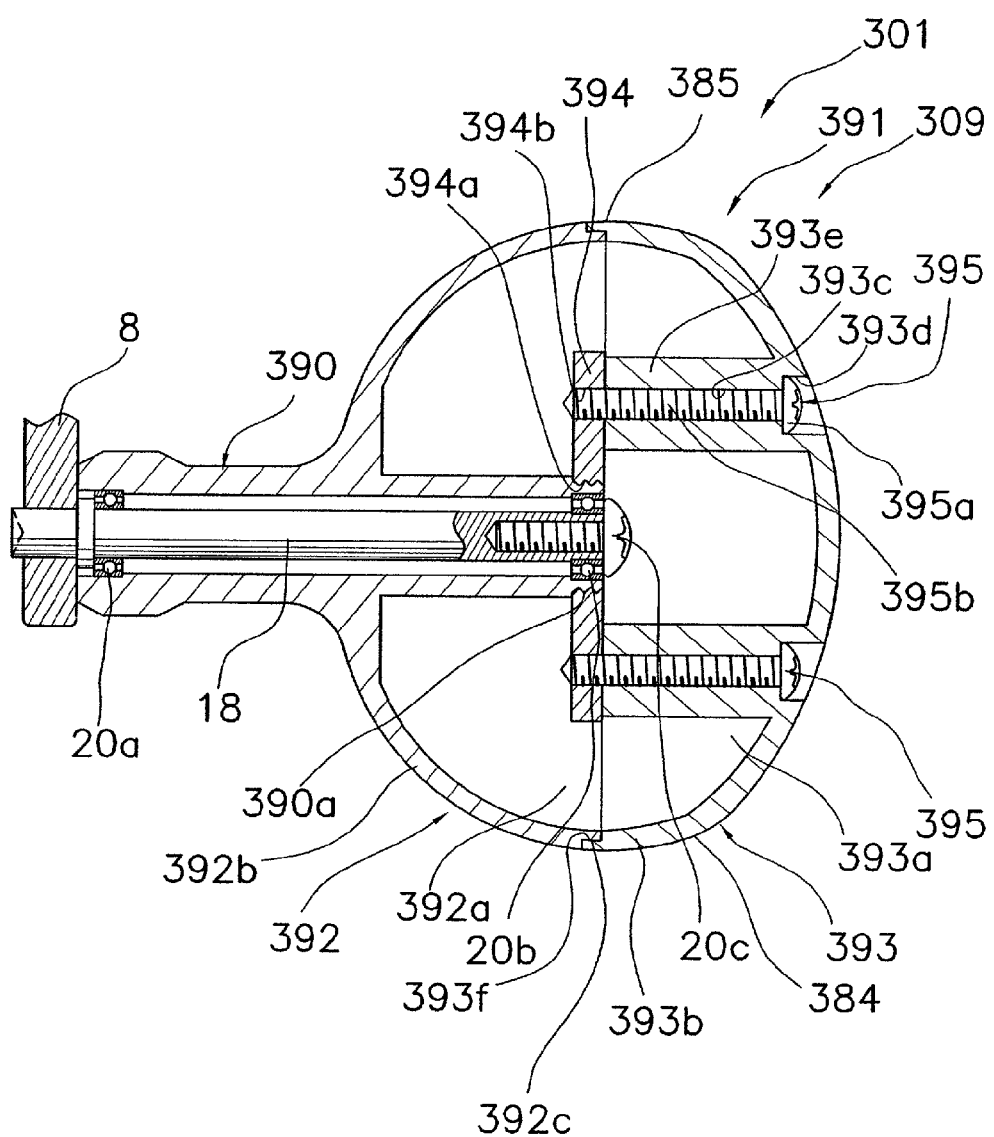
FIG. 15 is a side cross sectional view of the handle knob of the handle assembly illustrated in FIG. 11 in accordance with the fourth embodiment of the present invention.

As shown in FIGS. 12 and 15, the tubular portion 390 is a tubular member that is open on a handle arm side. The tubular portion 390 is unitarily formed with the knob portion 391 by means of machining after die casting metal such as brass or the like. As shown in FIG. 15, the tubular portion 390 and an inner peripheral portion of the knob portion 391 are rotatively supported on the outer peripheral surface of the knob shaft 18 via first and second bearings 20*a* and 20*b*. The knob shaft 18 retains the tubular portion 390 and the knob portion 391 by means of a screw member 20*c*. A handle arm end of the tubular portion 390 is designed so as to have a larger diameter than other portions of the tubular portion 390.

Figure 14:
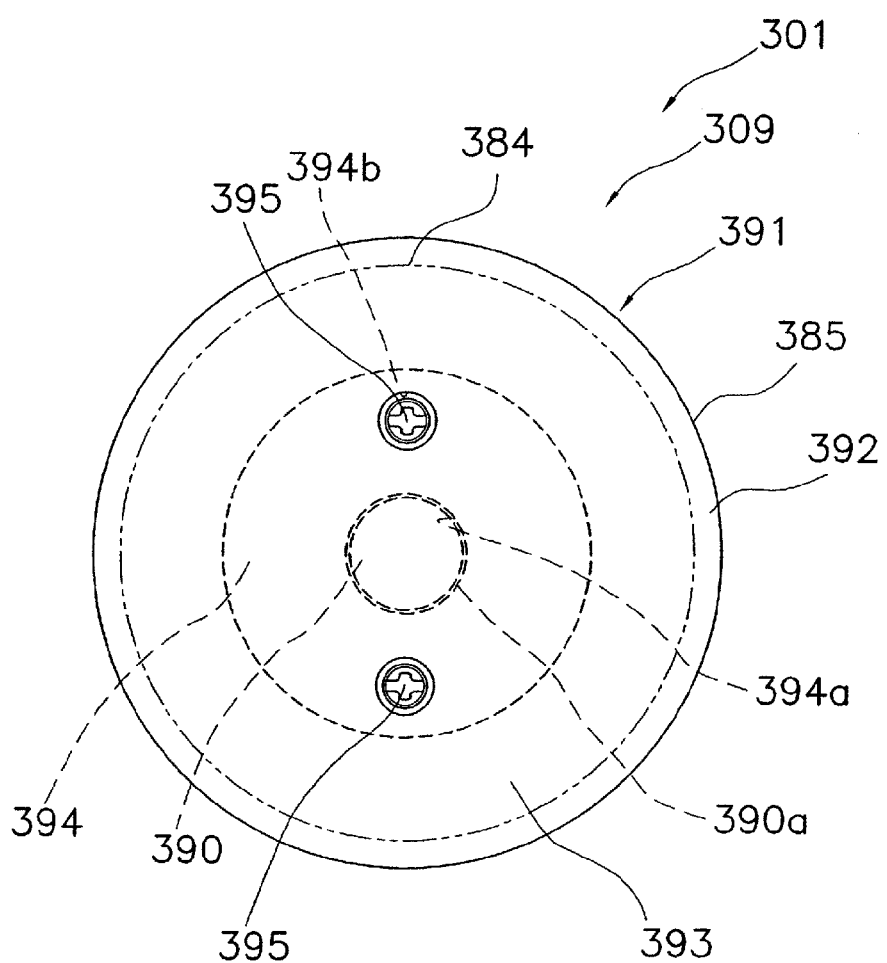
FIG. 14 is a grasp side elevational view of the handle knob of the handle assembly illustrated in FIG. 11 in accordance with the fourth embodiment of the present invention.

As shown in FIGS. 14 and 15, the tubular portion 390 has a second male threaded portion 390*a* formed on the outer periphery of the tip portion of the tubular portion 390. The second male threaded portion 390*a* is formed so as to have a smaller diameter than other portions of the tubular portion 390. A step is formed on the handle arm side of the second male threaded portion 390*a*. The second male threaded portion 390*a* is threaded into a second female threaded portion 394*a* that is formed in an inner peripheral portion of the attachment member 394.

The knob portion 391 has a first knob 392 having a first space 392*a* in the interior thereof and a second knob 393 that is disposed on a side of the first knob 392 opposite the handle arm 8 or tubular portion 390. The first knob 392 has a substantially spherically shaped outer peripheral surface connected to an outer periphery of the tubular portion 390 so as to cover a tip of the tubular portion 390. The second knob 393 is detachably mounted and unitarily linked with the first knob 392 on a side of the first knob 392 opposite the handle arm 8 or tubular portion 390. The second knob 393 has a substantially spherically shaped outer peripheral surface with a diameter larger than a diameter of the first knob 392. The knob portion 391 has an outermost radial portion 385. A junction 384 is on the of the first knob 392

As shown in FIGS. 12 and 15, the first knob 392 has a first space 392a in the interior of the first knob 392, a substantially hemispherical first outer peripheral portion 392b that is unitarily formed with the tubular portion 390 and a first engagement portion 392c. The first outer peripheral portion 392b is formed by machining after die casting metal such as brass or the like.

The second knob 393 has a second space 393a, a second outer peripheral portion 393b, a through hole 393c, a plurality of stepped recesses 393d, two bosses 393e and a second engagement portion 393f. The second space 393a is in the interior of the second knob 393. The second space 393a is formed by machining after die casting metal such as brass or the like. The second space 393a communicates with the first space 392a. The second outer peripheral portion 393b is detachably attached to the first outer peripheral portion 392b substantially at the outermost radial portion 385. Specifically, the first engagement portion 392c and the second engagement portion 393f mutually engage substantially at the outermost radial portion 385. Once engaged, the first engagement portion 392c, the second engagement portion 393f, the first outer peripheral portion 392b and the second outer peripheral portion 392c form a substantially smooth outer surface. The second outer peripheral portion 393b is integrally formed with the second engagement portion 393f and the remaining portion of the second knob 393. The second outer peripheral portion 393b is integrally and smoothly linked with the remaining portion 393b of the second knob 393 at a junction 384.

As shown in FIGS. 14 and 15, the knob portion 391 further includes an attachment member 394 with an inner peripheral portion mounted and fixed to the outer periphery of the tip of the tubular portion 390. The attachment member 394 has an outer portion configured to be coupled to the second knob 393 by a plurality of screw members 395 inserted from outside of the outer peripheral surface of the second knob 393. Preferably, two screw members 395 are used so as to be substantially parallel with the knob shaft 18.

As shown in FIG. 15, the first knob 392 and the second knob 393 are engaged so that the outer shapes thereof are smoothly continuous, and are formed into a substantially spherical shape that is concentric with respect to the axis of the knob shaft 18. As shown in FIG. 15, the two bosses 393e project outward in column shapes so as to be parallel with the knob shaft 18. The two bosses 393e are unitarily formed on a portion of an inner peripheral surface of the second knob 393 that faces the tubular portion 390. The stepped recesses 393d have diameters that are larger than the through hole 393c. The through hole 393c, in which the two screw members 395 are inserted, is formed in each of the two bosses 393e. Each of the screw members 395 has a head portion 395a and a first male threaded portion 395b. The through holes 393c have larger diameters than the first male threaded portion 395b of the screw member 395. The head portions 395a of the screw members 395 are accommodated in the stepped recess portions 393d.

The attachment member 394 has a second female threaded portion 394a and a first female threaded portion 394b. The second female threaded portion 394a is formed in the inner peripheral portion of the attachment member 394. The second female threaded portion 394a is screwed onto the second male threaded portion 390a of the tubular portion 390. The first female threaded portion 394b is screwed onto the first male threaded portions 395b of the screw members 395 in two locations on the surface opposite a handle arm side of the outer peripheral portion. The two first female threaded portions 394b are formed in positions that communicate with the through holes 393c. The through holes 393c are respectively formed in the two bosses 393b of the second knob 393. The through holes 393c pass through the outer peripheral surface of the second knob 393 on the side opposite the tubular portion 390. The second female threaded portion 394a threads onto the second male threaded portion 390a of the tubular portion 390.

When assembling the handle knob 309, the tubular portion 390 is first rotatably mounted with respect to the knob shaft 18 and retained by means of the screw member 20c. Next, the second female threaded portion 394a of the attachment member 394 is screwed onto the second male threaded portion 390a of the tubular portion 390. The attachment member 394 is mounted and adhesively fixed to the outer periphery of the tip of the tubular portion 390. Next, a surface of the first outer peripheral portion 392b is engaged with a front end surface of the second outer peripheral portion 393b. The first male threaded portion 395b of the screw members 395 is inserted into the through holes 393c of the second knob 393. Then, the first male threaded portion 395b is screwed into the first female threaded portion 394b. The first male threaded portion 395b is screwed into the female threaded portion 394b until the head portion 395a contacts the stepped recess 393d to fix the second knob 393 to the tubular portion 390. In this way, the second knob 393 is detachably mounted with respect to the tubular portion 390 and the first knob 392.

Thus, when the handle assembly 301 is to be rotated, particularly when jigging is to be performed, the entire handle knob 309 is firmly grasped with the palm. Here, because the outer peripheral surface of the knob portion 391 is formed into a substantially spherical shape, the entire handle knob 309 is firmly grasped with the palm.

In addition, because this handle knob 309 has the first space 392a and the second space 393a formed in the interior of the first knob 392 and the second knob 393, respectively, the entire handle knob 309 is reduced in weight. Furthermore, because the attachment member 394 on which the screw members 395 are mounted is provided separately from the tubular portion 390, it will no longer be necessary to machine a boss portion having a large diameter that is on the outer periphery of the tip of the tubular portion 390 as is conventional. Thus, the second knob 393 is detachably mounted on the first knob 392 with an inexpensive construction.

In the fourth embodiment, the first knob 392 is unitarily formed with the tubular portion 390. However, the tubular portion and the first knob may also be formed separately. In addition, although the first knob 392 and the second knob 393 are formed by machining after die casting metal such as brass or the like, other metals, a synthetic resin, a carbon fiber reinforced resin (CFRP) or the like may be used to form the first knob and the second knob. Furthermore, the first knob 392 and the second knob 393 are not limited to being machined after a metal such as brass or the like is die cast and may be formed only by machining metal such as brass or the like.

The configuration of the spinning reel is not limited to the above embodiment, and the present invention can also be applied to a spinning reel that has no drag mechanism, or has one on the rear thereof. The present invention can further be applied to a spinning reel in which a brake mechanism having a brake lever is mounted instead of a reverse rotation prevention mechanism.

Fifth Embodiment

Figure 16:
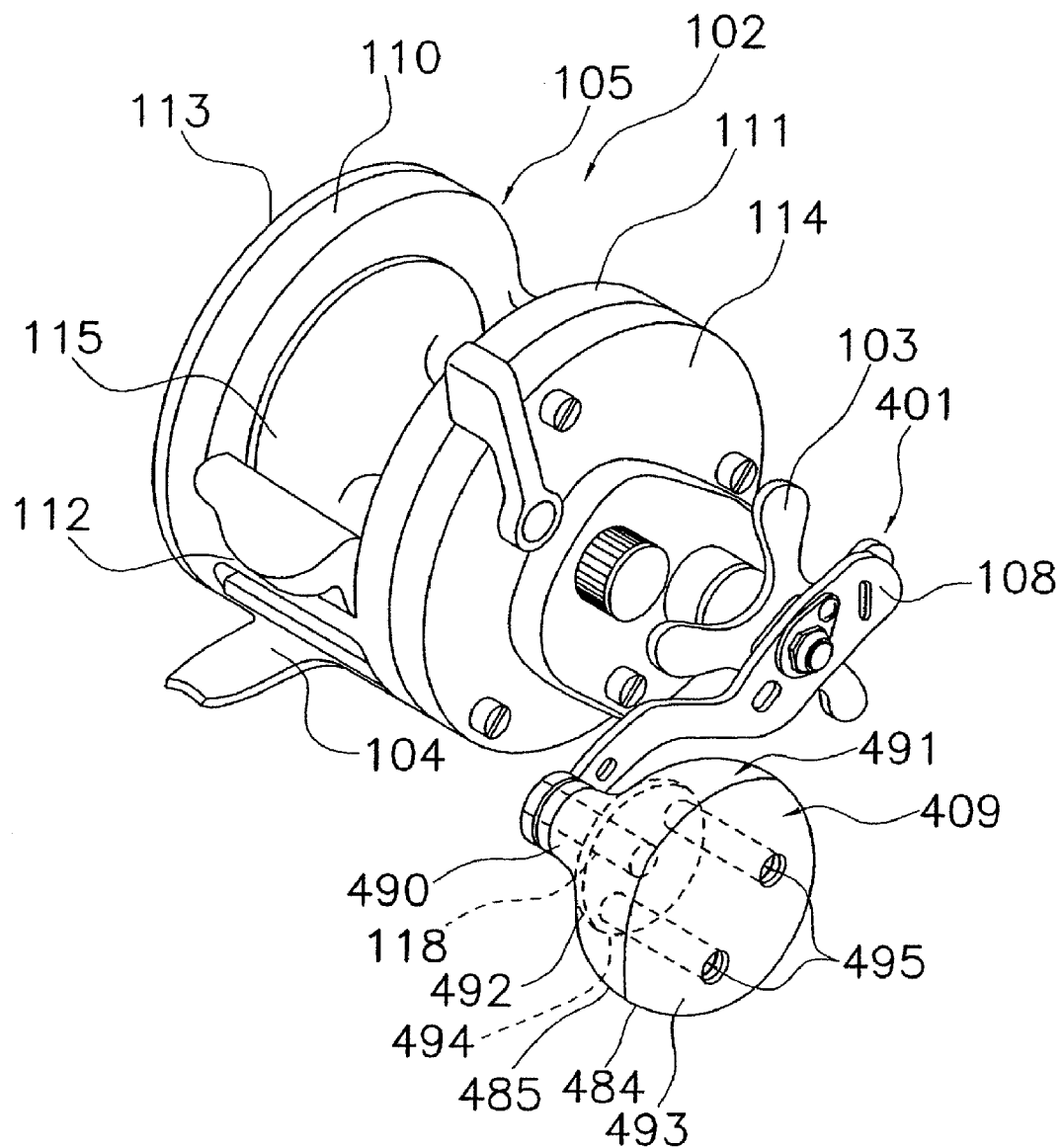
FIG. 16 is a perspective view of a dual bearing reel with a handle assembly in accordance with a fifth embodiment of the present invention.

Referring now to FIG. 16, a dual bearing reel in accordance with a fifth embodiment will now be explained. In view of the similarity between the second and fifth embodiments, the parts of the fifth embodiment that are identical to the parts of the second embodiment will be given the same reference numerals as the parts of the second embodiment. Moreover, the descriptions of the parts of the fifth embodiment that are identical to the parts of the second embodiment may be omitted for the sake of brevity.

In the fifth embodiment, the present invention is applied to a handle for a low profile type of bait reel or a round-type dual bearing reel as shown in FIG. 16 rather than a spinning reel.

A single handle type dual bearing reel in which a fifth embodiment of the present invention is adopted, as shown in FIG. 16, includes a handle assembly 401. The handle assembly 401 is disposed on the side of the reel unit 102 and serves to rotate the spool 115. The structure of the dual bearing reel other than the handle assembly 401 is omitted for the sake of brevity since the dual bearing reel is essentially the same as the second embodiment shown in FIG. 9.

The handle assembly 401 has the handle arm 108, the knob shaft 118 and a handle knob 409. The handle arm 108 is configured and arranged to be non-rotatably mounted to the tip of the handle shaft (not shown) at a base end of the handle arm 108. The handle arm 108 is configured and arranged to extend substantially perpendicular to an axial center of the handle shaft. The knob shaft 118 is fixed or screwed to the tip of the handle arm 108 and extends in a direction substantially perpendicular to the handle arm 108. The handle knob 409 is rotatively mounted on the knob shaft 118.

The handle knob 409 has a tubular portion 490 that is mounted on the outer peripheral surface of the knob shaft 118, and a substantially spherical knob portion 491 that is unitarily formed with the tubular portion 490. The knob portion 491 has a first knob 492 that is disposed on the handle arm 108 side and whose outer peripheral surface is formed in a substantially hemispherical shape, a second knob 493 that is disposed on the opposite side of the handle arm 108 and whose outer peripheral surface is formed in a substantially hemispherical shape, and a disk shaped attachment member 494 that is mounted and fixed to the outer periphery of the tip of the tubular portion 490 and whose outer peripheral portion can screw the second knob 493 onto the tubular portion 490 by means of two screw members 495 inserted from the outer peripheral portion of the rear end side of the second knob 493.

Here, as in the aforementioned embodiment, because the attachment member 494 on which the screw members are mounted is arranged separate from the tubular portion 490, the second knob 493 can be detachably mounted on the first knob 492 with an inexpensive construction.

Sixth Embodiment

Figure 17:
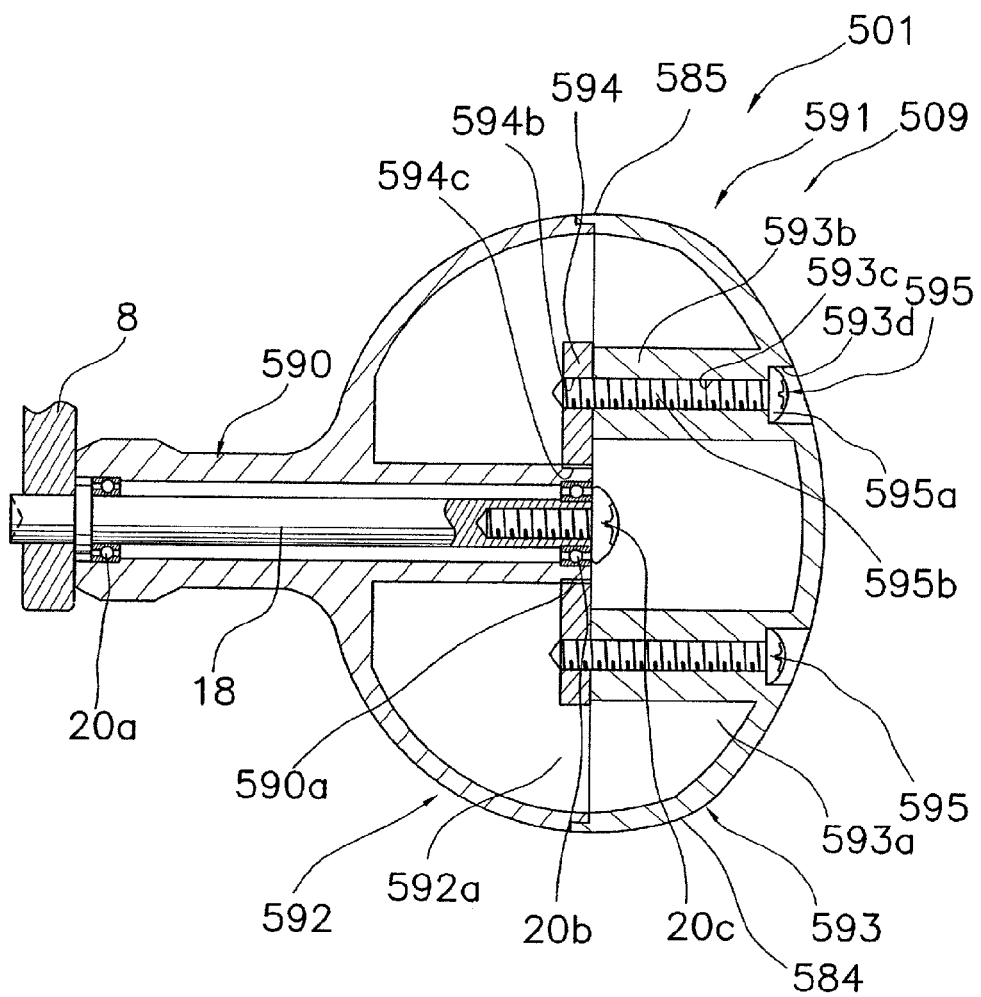
FIG. 17 is a side cross sectional view of a handle knob of a handle assembly in accordance with a sixth embodiment of the present invention.

Referring now to FIG. 17, a spinning reel in accordance with a sixth embodiment will now be explained. In view of the similarity between the fourth and sixth embodiments, the parts of the sixth embodiment that are identical to the parts of the fourth embodiment will be given the same reference numerals as the parts of the fourth embodiment. Moreover, the descriptions of the parts of the sixth embodiment that are identical to the parts of the fourth embodiment may be omitted for the sake of brevity.

In the fourth embodiment, the second female threaded portion 394a is screwed onto the second male threaded portion 390a of the tubular portion 390 in order to fix the attachment member 394 to the tubular portion 390. However, as shown in FIG. 17, the inner peripheral portion 594c of the attachment member 594 may be designed so as to be pressure welded to the outer peripheral portion of the tip of the tubular portion 590 and fix the attachment member 594 to the tubular portion 590. In addition, an adhesive may be applied when pressure welding the inner peripheral portion 594c of the attachment member 594 to the outer peripheral portion 590b of the tip of the tubular portion 590. Alternatively, an adhesive only may be used to fix the attachment member 594 to the tubular portion 590.

In the fourth embodiment, the attachment member 394 is fixed to the rear surface of the outer peripheral portion of the second knob 393 by means of the two screw members 395 inserted from the outer peripheral portion of the rear end of the second knob 393 so as to be parallel with the knob shaft 18. However, the mounting positions and mounting directions of the screw members 395 are not limited to these, and for example, the second knob 393 may be designed so as to be fixed to the outer peripheral surface of the attachment member 394 by means of the two screw members 395 inserted from the outer peripheral portion on the front end side of the second knob 393 so as to be perpendicular to the knob shaft 18.

Seventh Embodiment

Referring now to FIGS. 18-22, a spinning reel in accordance with a seventh embodiment will now be explained. In view of the similarity between the fourth and seventh embodiments, the parts of the seventh embodiment that are identical to the parts of the fourth embodiment will be given the same reference numerals as the parts of the fourth embodiment. Moreover, the descriptions of the parts of the seventh embodiment that are identical to the parts of the fourth embodiment may be omitted for the sake of brevity.

Figure 18:
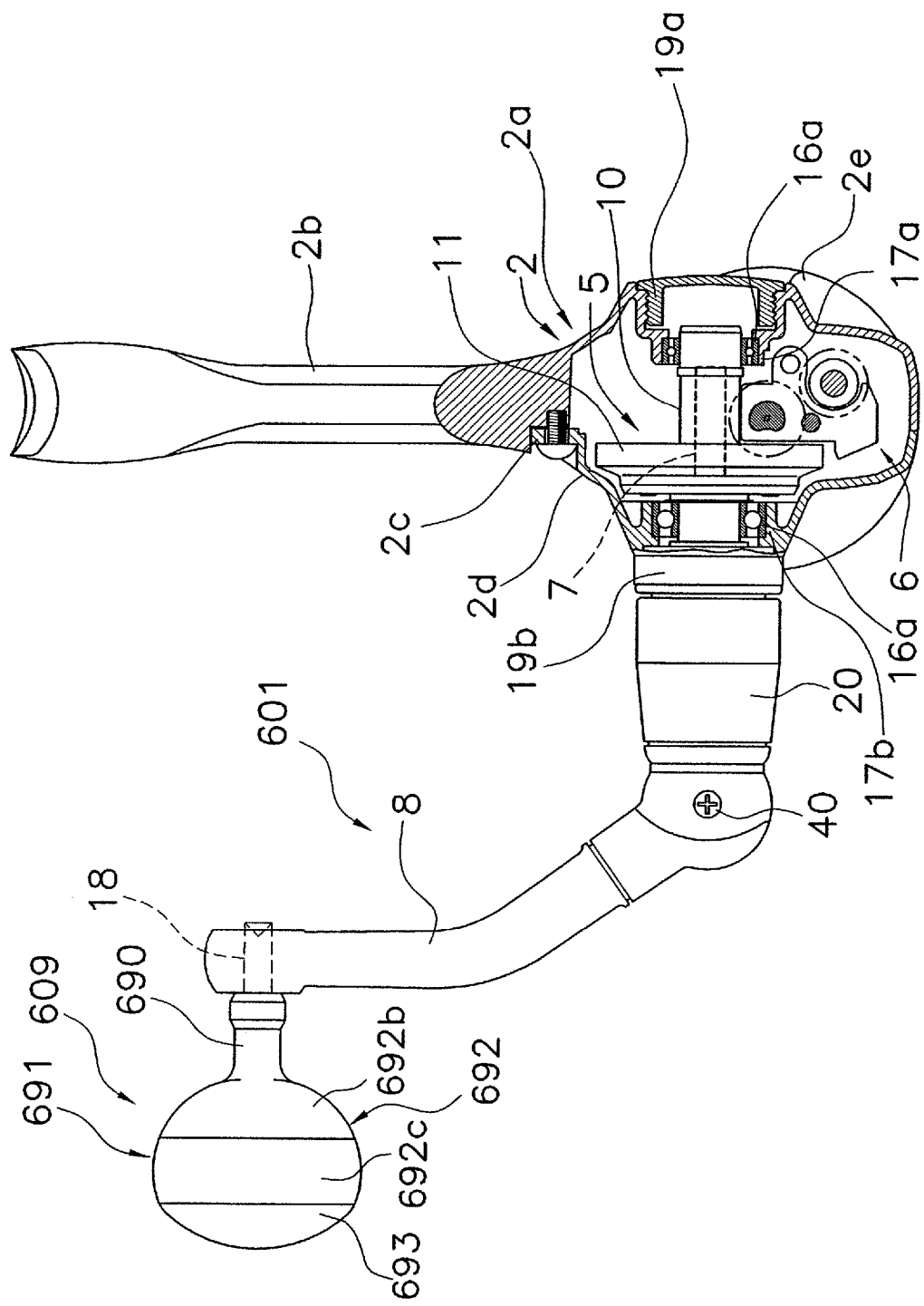
FIG. 18 is a side partial cross sectional view of a handle assembly in accordance with a seventh embodiment of the present invention.

As shown in FIG. 18, the handle assembly 601 according to a seventh embodiment of the present invention includes a handle arm 8 that is mounted on the tip of a handle shaft 10 and a handle knob 609 that is mounted on the tip of the handle arm 8. The handle knob 609 is rotatably mounted on a knob shaft 18. The knob shaft 18 is deformed at an end so as to be retained on the tip of the handle arm 8.

Figure 19:
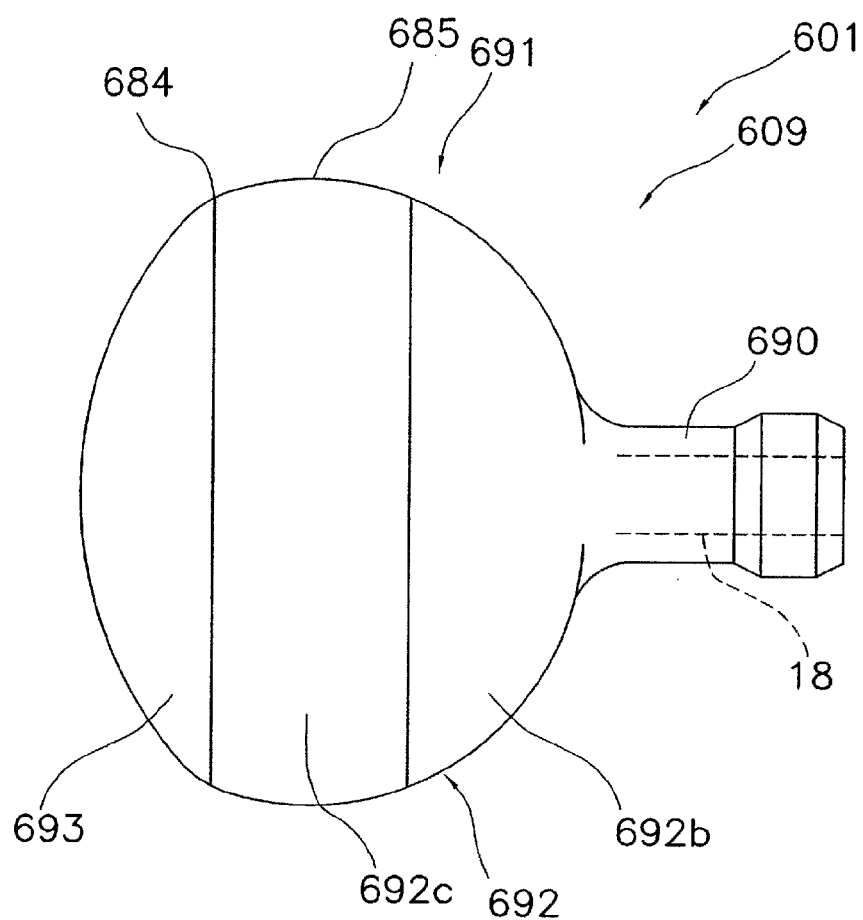
FIG. 19 is a side view of a handle knob of the handle assembly illustrated in FIG. 18 in accordance with the seventh embodiment of the present invention.
Figure 20:
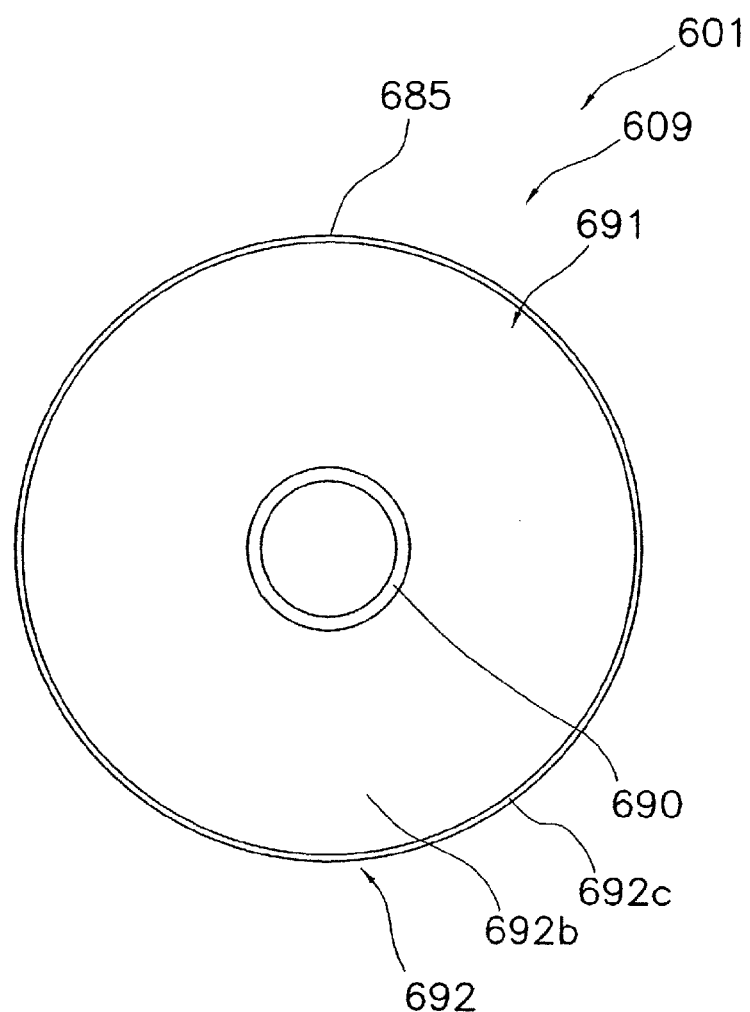
FIG. 20 is a handle arm side elevational view of the handle knob of the handle assembly illustrated in FIG. 18 in accordance with the seventh embodiment of the present invention.
Figure 21:
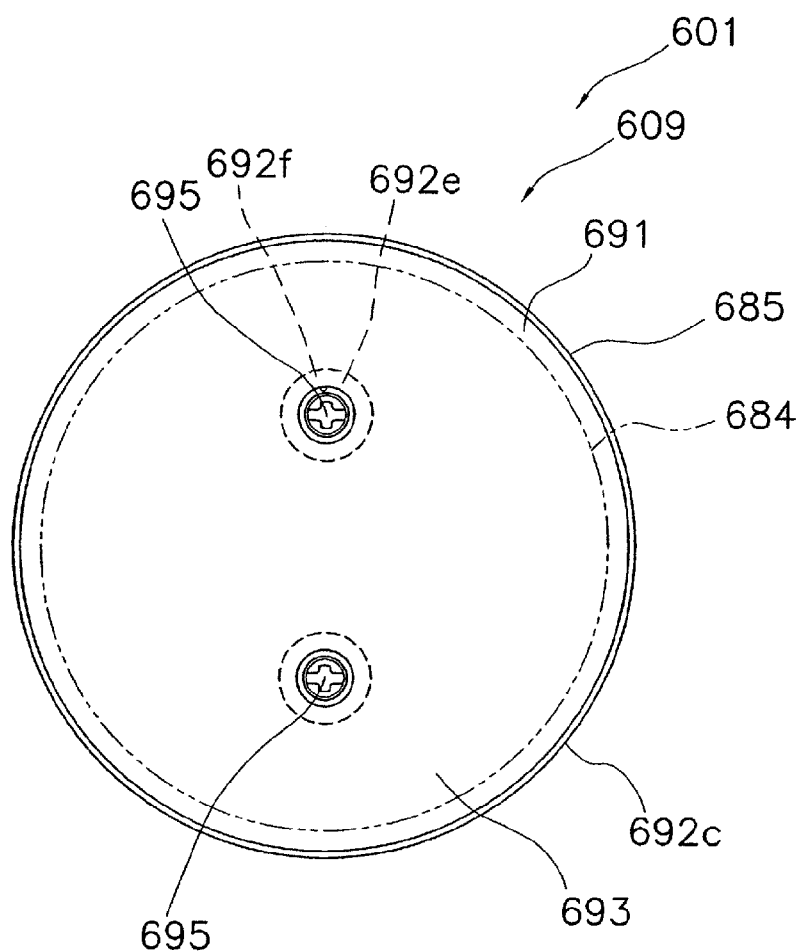
FIG. 21 is a grasp side elevational view of the handle knob of the handle assembly illustrated in FIG. 18 in accordance with the seventh embodiment of the present invention.

As shown in an enlarged form in FIGS. 19-22, the handle knob 609 has a tubular portion 690 that is mounted on the outer peripheral side of the knob shaft 18, and a substantially spherical knob portion 691 that is unitarily formed with the tubular portion 690. The knob portion 691 has a first knob 692 that is disposed on the handle arm 8 side and in which the outer peripheral surface thereof is formed into a substantially hemispherical shape, and a second knob 693 that is disposed on the side of the first knob 692 opposite the handle arm 8 and in which the outer peripheral surface thereof is formed into a substantially hemispherical shape having a diameter larger than the first knob 692. As shown in FIG. 19, the second knob 693 is detachably linked with the first knob 692 in a junction 684 positioned on the opposite side of the handle arm 8 from the outermost radial portion 685 of the first knob 692, so that the outer shape is smoothly unitary.

Figure 22:
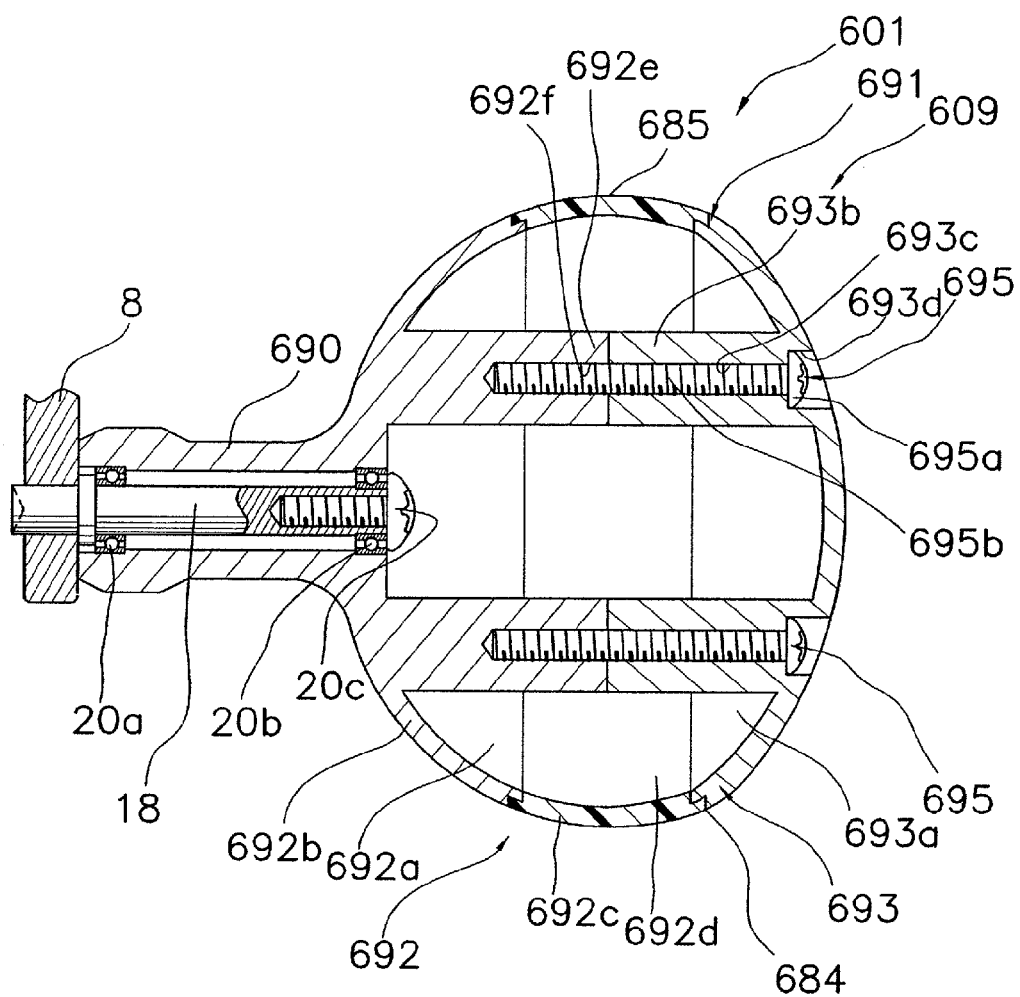
FIG. 22 is a side cross sectional view of the handle knob of the handle assembly illustrated in FIG. 18 in accordance with the seventh embodiment of the present invention.

As shown in FIGS. 19 and 22, the tubular portion 690 is a tubular member which is open on the handle arm 8 side. The tubular portion 690 is unitarily formed with the knob portion 691 by means of machining after die casting metal such as brass or the like. As shown in FIG. 22, the tubular portion 690 and the inner peripheral portion of the knob portion 691 are rotatively supported on the outer peripheral portion of the knob shaft 18 via bearings 20a, 20b. As shown in FIG. 22, the tip of the knob shaft 18 retains the tubular portion 690 and the knob portion 691 by means of a screw member 20c. A handle arm side of the tubular portion 690 has a larger diameter than other portions of the tubular portion 690.

As shown in FIGS. 19 and 22, the first knob 692 of the knob portion 691 has a first separate member 692b formed into a substantially spherical shape and connected to the tubular portion 690, and a second separate member 692c formed into a substantially spherical shape and detachably attached to the first separate member 692b on the opposite side of the handle arm 8. The first separate member 692b has a first space 692a in the interior thereof that is unitarily formed with the tubular portion 690 by machining after die casting metal such as brass or the like. The second separate member 692c has a second space 692d in the interior thereof that is formed by means of casting synthetic resin. The second separate member 692c is detachably mounted on the first separate member 692b in a position opposite the handle arm 8 and communicates with the first space 692a in the interior thereof. The second knob 693 has a third space 693a in the interior thereof that is formed by machining after die casting metal such as brass or the like. The second knob 693 is detachably mounted on the second separate member 692c in a position opposite the handle arm 8 and communicates with the second space 692d in the interior thereof. The second knob 693 is screwed onto the first separate member 692b by two screw members 695 that are inserted from the outer peripheral portion of the second knob 693. The second separate member 692c is sandwiched between the first separate member 692b and the second knob 693.

As shown in FIG. 22, the first separate member 692b, the second separate member 692c, and the second knob 693 are engaged so that the outer shapes thereof are smoothly continuous. The first separate member 692b, the second separate member 692c, and the second knob 693 are formed into a substantially spherical shape that is concentric with respect to the axis of the knob shaft 18.

As shown in FIG. 22, two first bosses 692e that project outward in column shapes are unitarily formed on a front end surface of an inner peripheral portion of the first separate member 692b opposite the handle arm 8. A first female threaded portion 692f that screws onto the first male threaded portions 695b of the two screw members 695 is formed in each of the two first bosses 692e. When the second separate member 692c is mounted on the first separate member 692b a tip of each of the two first bosses 692e extends to a position on an inner peripheral side of the second separate member 692c.

The second separate member 692c is a substantially tubular member that is formed by die casting a synthetic resin. The second separate member 692c is formed from a different material than that of the first separate member 692b and the second knob 693. The outer peripheral surface of the second separate member 692c is curved so that the outer shape will smoothly connect with the first separate member 692b and the second knob 693. The outermost radial portion 685 is located on the second separate member 692c.

The second knob 693 is a substantially hemispherical member that is formed by machining after die casting metal such as brass or the like. The second knob 693 is formed from the same material as the first separate member 692b. As shown in FIG. 22, two second bosses 693b that project outward in column shapes are unitarily formed on a rear end surface of an inner peripheral portion of the second knob 693. A plurality of stepped recesses 693d and a plurality of through holes 693c are respectively formed in the two second bosses 693b. The stepped recesses 693d have diameters that are larger than a diameter of the through holes 693c. The two screw members 695 are inserted in the through holes 693c. A tip of each of the two second bosses 693b is arranged in a position that faces the tip of each of the two first bosses 692e of the first separate member 692b. The tips of the first and second bosses 692e and 693b extend so as to be positioned on the inner peripheral side of the second separate member 692c. In addition, the through holes 693c of the second bosses 693b are formed in positions that communicate with the first female threaded portions 692f of the first bosses 692e. The through holes 693c are formed so as to have larger diameters than the first male threaded portions 695b of the screw members 695. A plurality of head portions 695a of the screw members 695 are formed so as to be accommodated in the stepped recess portions 693d.

As shown in FIG. 22, when assembling this type of handle knob 609, the tubular portion 690 is first rotatably mounted with respect to the knob shaft 18, and retained by means of the screw member 20c. Then, the rear end surface of the first separate member 692b is engaged with the front end surface of the second separate member 692c, and the rear end surface of the second separate member 692c is engaged with the first end surface of the second knob 693. In this state, the first male threaded portions 695b of the screw members 695 are inserted into the through holes 693c of the second knob 693. Then, the first male threaded portions 695b of the screw members 695 are screwed into the first female threaded portions 692f of the first separate member 692b. The head portions 695a of the screw members 695 are screwed until they come into contact with the stepped recesses 693d to fix the second knob 693 to the first separate member 692b. In this way, the second separate member 692c is sandwiched between the first separate member 692b and the second knob 693 so as to be non-movable in the axial direction.

Thus, when the handle assembly 601 is to be rotated, particularly when jigging is to be performed, the entire handle knob 609 is firmly grasped with the palm. Here, because the outer peripheral surface of the knob portion 691 is formed into a substantially spherical shape, the entire handle knob 609 is firmly grasped with the palm. Thus when the handle knob 609 is grasped, the fingertips contact the outer peripheral surface of the first separate member 692b, and the palm contacts the outer peripheral surface of the second knob 693. Because the first separate member 692b and the second knob 693 are formed from the same metal material such as brass or the like, the first separate member 692b, which is in contact with the fingertips, and the second knob 693, which is in contact with the palm, feels the same when the handle knob 609 is grasped. Thus, the feeling when the handle knob 609 is grasped is improved.

Because the second separate member 692c is formed from a synthetic resin, the overall weight of the handle knob 609 is reduced. Furthermore, the attractiveness of the outer appearance is maintained at a high level due to the first separate member 692b and the second knob 693 being made of metal.

The configuration of the spinning reel is not limited to the above embodiment, and the present invention can also be applied to a spinning reel that has no drag mechanism, or has a drag mechanism on the rear thereof. The present invention can further be applied to a spinning reel in which a brake mechanism having a brake lever is mounted instead of the reverse rotation prevention mechanism.

In the aforementioned embodiment, the first separate member 692 is unitarily formed with the tubular portion 690. However, the tubular portion 690 and the first separate member 692b may also be formed separately. In addition, although the first separate member 692b and the second knob 693 are formed by machining after die casting metal such as brass or the like, a metal other than brass, a synthetic resin instead of a metal, or a carbon fiber reinforced resin (CFRP) or the like may be used to form the first separate member 692b and the second knob 693. Furthermore, the first separate member 692b and the second knob 693 are not limited to being machined after die casting a metal such as brass or the like and may be formed only by machining metal such as brass or the like.

Eighth Embodiment

Figure 23:
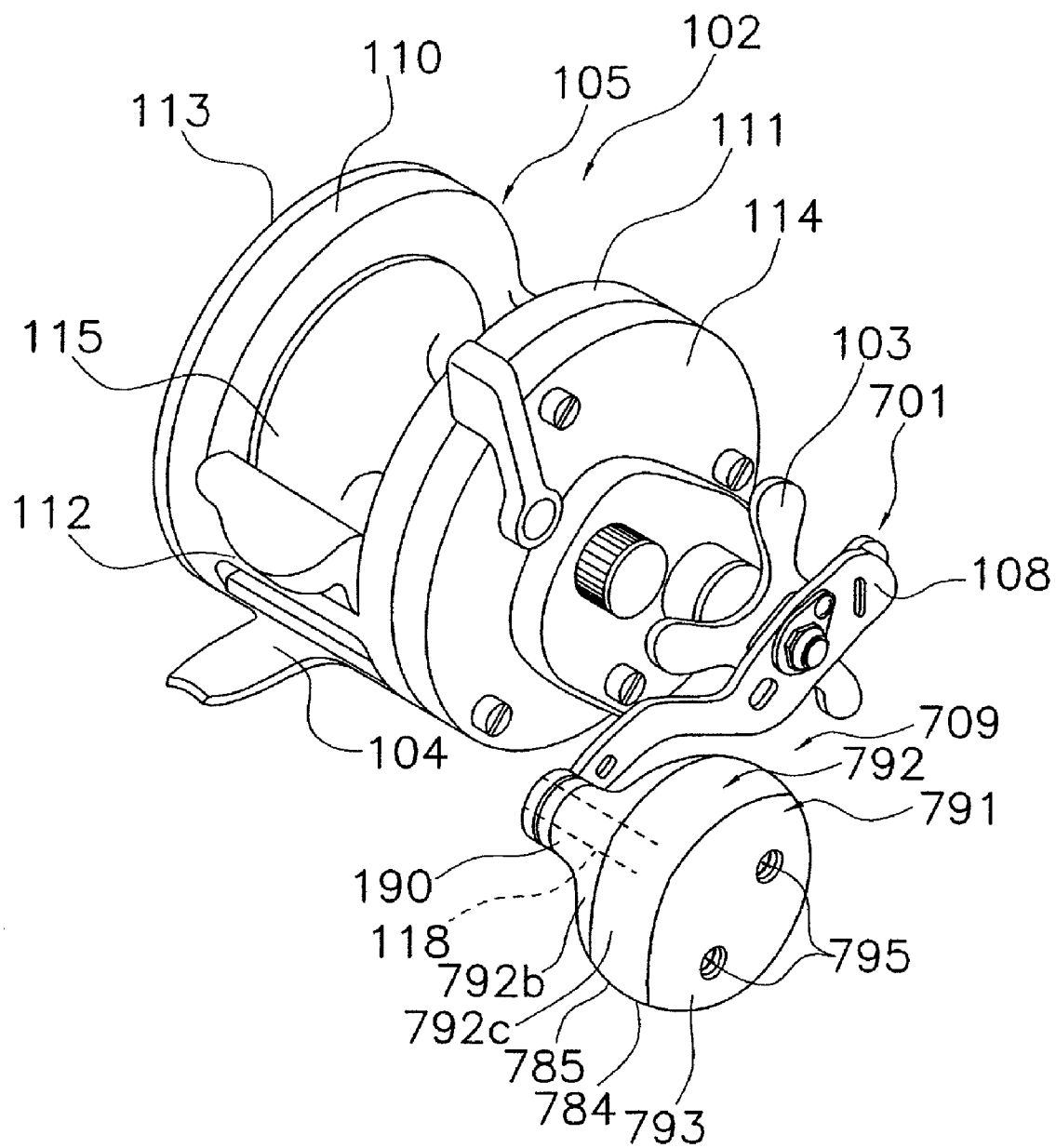
FIG. 23 is a perspective view of a dual bearing reel with a handle assembly in accordance with an eighth embodiment of the present invention.

Referring now to FIG. 23, a spinning reel in accordance with an eighth embodiment will now be explained. In view of the similarity between the second and eighth embodiments, the parts of the eighth embodiment that are identical to the parts of the second embodiment will be given the same reference numerals as the parts of the second embodiment. Moreover, the descriptions of the parts of the eighth embodiment that are identical to the parts of the second embodiment may be omitted for the sake of brevity.

In the eighth embodiment, the present invention is applied to a handle for a low profile type of bait reel or a round-type dual bearing reel as shown in FIG. 23, rather than a spinning reel.

A single handle type dual bearing reel in which an eighth embodiment of the present invention is adopted, as shown in FIG. 23, includes a handle assembly 701. The handle assembly 701 is disposed on the side of the reel unit 102 and serves to rotate the spool 115. The structure of the dual bearing reel other than the handle assembly 701 is omitted for the sake of brevity since the dual bearing reel is essentially the same as the second embodiment shown in FIG. 9.

The handle assembly 701 has the handle arm 108, the knob shaft 118 and a handle knob 709. The handle arm 108 is configured and arranged to be non-rotatably mounted to the tip of the handle shaft (not shown) at a base end of the handle arm 108. The handle arm 108 is configured and arranged to extend substantially perpendicular to an axial center of the handle shaft. The knob shaft 118 is fixed or screwed to the tip of the handle arm 108 and extends in a direction substantially perpendicular to the handle arm 108. The handle knob 709 is rotatively mounted on the knob shaft 118.

The handle knob 709 has a tubular portion 790 that is mounted on the outer peripheral side of the knob shaft 118, and a substantially spherical knob portion 791 that is unitarily formed with the tubular portion 790. The knob portion 791 has a first knob 792 and a second knob 793. The first knob 792 is disposed on a handle arm side of the knob portion 791. An outer peripheral surface of the first knob 792 is formed into a substantially hemispherical shape. The second knob 793 is disposed on the side of the first knob 792 opposite the handle arm 8. As shown in FIG. 23, the second knob 793 is detachably linked with the first knob 792 at a junction 784 positioned on the opposite side of the handle arm 108 from the outermost radial portion 785 of the first knob 792, such that the outer shape is smoothly unitary.

The first knob 792 of the knob portion 791 has a first separate member 792b formed into a substantially spherical shape and connected to the tubular portion 790. The second separate member 792c is formed into a substantially spherical shape and detachably attached to the first separate member 792b on the opposite side of the handle arm 108. The second knob 793 is screwed onto the first separate member 792b by two screw members 795 that are inserted from the outer peripheral portion thereof. The second separate member 792c is sandwiched between the first separate member 792b and the second knob 793.

Here, like in the aforementioned embodiment, by forming the handle knob 709 with the first separate member 792b, the second separate member 792c, and the second knob 793, the overall weight thereof is reduced and the attractiveness of the outer appearance is maintained at a high level while improving the feeling when the handle knob 709 is grasped.

Ninth Embodiment

Figure 24:
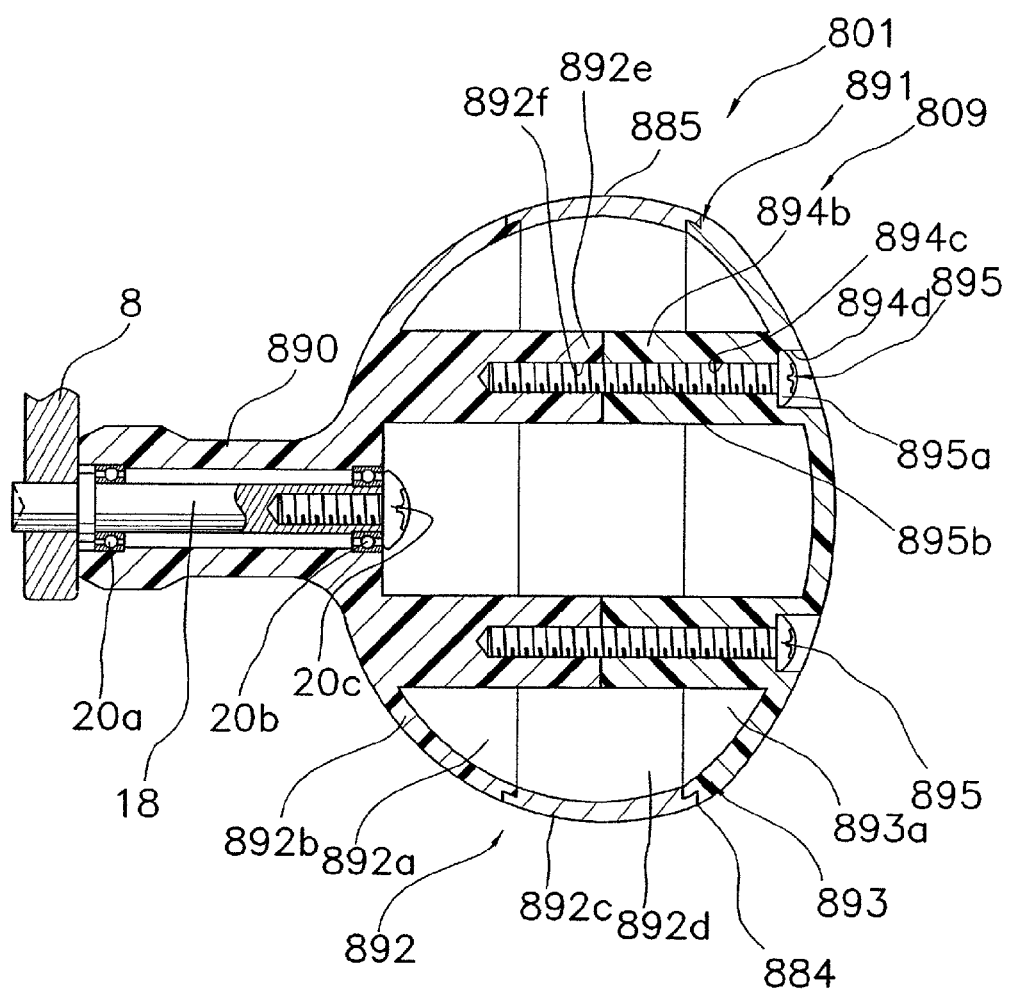
FIG. 24 is a side cross sectional view of a handle knob of a handle assembly in accordance with a ninth embodiment of the present invention.

Referring now to FIG. 24, a spinning reel in accordance with a ninth embodiment will now be explained. In view of the similarity between the seventh and ninth embodiments, the parts of the ninth embodiment that are identical to the parts of the seventh embodiment will be given the same reference numerals as the parts of the seventh embodiment. Moreover, the descriptions of the parts of the ninth embodiment that are identical to the parts of the seventh embodiment may be omitted for the sake of brevity.

In the seventh embodiment, the second separate member 692c was formed from a synthetic resin. However, the second separate member 692c may also be formed from metal, a carbon fiber reinforced resin (CFRP) or the like. For example, as shown in FIG. 24 in accordance with the ninth embodiment of the present invention, a first separate member 892b and a second knob 893 may be formed from a synthetic resin such as a carbon fiber reinforced resin (CFRP). A second separate member 892c may be formed from a metal such as a light metal or the like that is lightweight.

In the ninth embodiment, the first separate member 892b and the second knob 893 are formed from a material that is different from the second separate member 892c, but may also be formed from a material that is the same as the second separate member 892c. For example, a construction is possible in which the first separate member 892b, the second separate member 892c and the second knob 893 are all formed from the same material.

In the aforementioned embodiment, the first separate member 892b and the second knob 893 are formed from the same material. However, the first separate member 892b and the second knob 893 may be formed from different materials. For example, a construction is possible in which the first separate member 892b, the second separate member 892c, and the second knob 893 are all formed from different materials. In addition, the first separate member 892b and the second separate member 892c may be formed from the same material, and the second knob 893 may be formed from a material that is different from the first separate member 892b and the second separate member 892c. In this case, the second knob is unitarily formed with the first knob without being separated. Furthermore, the second separate member 892c and the second knob 893 may be formed from the same material, and the first separate member 892b may be formed from a material that is different from the second separate member 892b and the second knob 893.

Tenth Embodiment

Figure 25:
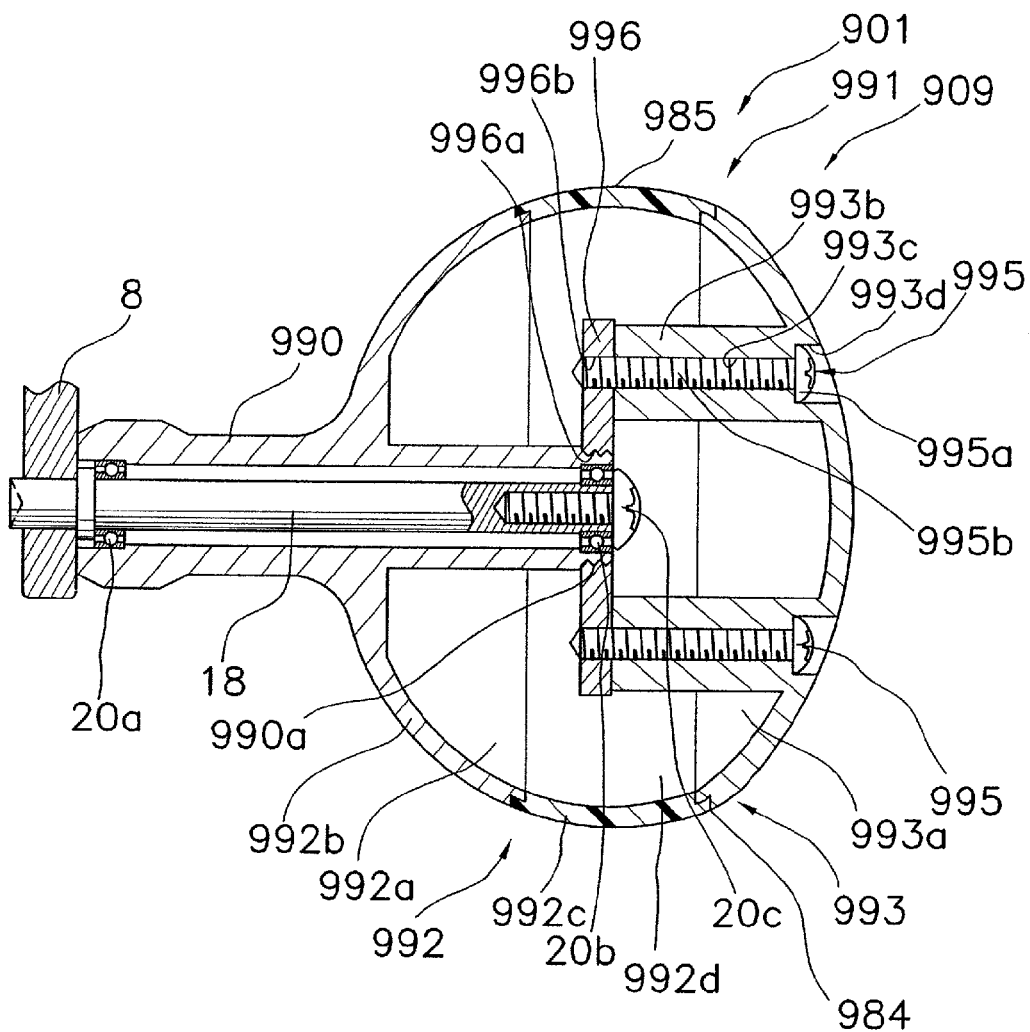
FIG. 25 is a side cross sectional view of a handle knob of a handle assembly in accordance with a tenth embodiment of the present invention.

Referring now to FIG. 25, a spinning reel in accordance with a tenth embodiment will now be explained. In view of the similarity between the eighth and tenth embodiments, the parts of the tenth embodiment that are identical to the parts of the eighth embodiment will be given the same reference numerals as the parts of the eighth embodiment. Moreover, the descriptions of the parts of the tenth embodiment that are identical to the parts of the eighth embodiment may be omitted for the sake of brevity.

The tenth embodiment is a combination of the fourth and eighth embodiments. As shown in FIG. 25, a construction is possible in which the second knob 993 is screwed to a disk shaped attachment member 996 that is fixed to the tip of the tubular portion 990 extending toward the inner periphery of the knob portion 991 as similar to the fourth embodiment.

As shown in FIG. 25, the tubular portion 990 has a second male threaded portion 990a formed on the outer periphery of the tip portion thereof. The attachment member 996 has a second female threaded portion 996a and a first female threaded portions 996b that is screwed onto the first male threaded portions 995b of the screw members 995 in two locations on the surface of the outer peripheral portion opposite the handle arm 8 side. The second female threaded portion 996a is formed in an inner peripheral portion of the attachment member 996. The second female threaded portion 996a is screwed onto the second male threaded portion 990a of the tubular portion 990.

When assembling this type of handle knob 909, the tubular portion 990 is rotatably mounted with respect to the knob shaft 18, and retained by means of the screw member 20c. Next, the second female threaded portion 996a of the attachment member 996 is screwed onto the second male threaded portion 990a of the tubular portion 990 and the attachment member 996 is fixed to the tubular portion 990 by applying adhesive thereto. Then, a rear end surface of the first separate member 992b is engaged with a front end surface of the second separate member 992c and a rear end surface of the second separate member 992c is engaged with a front end surface of the second knob 993. In this state, the screw members 995 are inserted into the through holes 993c of the second knob 993. Then, the screw members 995 are screwed into the first female threaded portions 996b of the attachment member 996. The head portions 995a of the screw members 995 are screwed until they come into contact with the stepped recesses 993d to fix the second knob 993 to the first separate member 992b. In this way, the second separate member 992c is sandwiched between the first separate member 992b and the second knob 993 so as to be non-movable in the axial direction.

Here, because the attachment member 996 is provided separately from the tubular portion 990, it will no longer be necessary to machine a boss portion having a large diameter that is on the outer periphery of the tip of the tubular portion 990. Thus, the second knob 993 is detachably mounted on the first separate member 992b with an inexpensive construction.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A handle knob for a fishing reel comprising:
    a tubular portion having an axis running therethrough in an axial direction,
    a knob portion including an outermost radial portion, a first knob with a substantially spherically shaped outer peripheral surface connected to an outer periphery of the tubular portion so as to cover a tip of the tubular portion and a second knob detachably mounted and unitarily linked on a side of the first knob opposite the tubular portion, the second knob having a substantially spherically shaped outer peripheral surface, and the first knob having a first space in an interior thereof and the second knob having a second space in the interior thereof that communicates with the first space; and
    an attachment member with an inner peripheral portion mounted and fixed to an outer periphery of the tip of the tubular portion and an outer portion configured to be coupled to the second knob by a plurality of screw members inserted from outside of the outer peripheral surface of the second knob.

2. The handle knob for a fishing reel according to claim 1, wherein
    the outer portion of the attachment member is configured with first female threaded portions that communicate with a through hole that passes through the outer peripheral surface of the second knob on the side opposite the tubular portion.

3. The handle knob for a fishing reel according to claim 1, wherein
    the attachment member is mounted and fixed to the tubular portion with a male threaded portion formed on the outer periphery of the tip of the tubular portion that is threaded into a female threaded portion formed in the inner peripheral portion.

4. The handle knob for a fishing reel according to claim 1, wherein
    the attachment member is mounted and adhesively fixed to the outer periphery of the tip of the tubular portion.

5. The handle knob for a fishing reel according to claim 1, wherein
    a surface of the attachment member on a side opposite of the tubular portion is positioned either so as to be substantially flush with the side of the first knob opposite the tubular portion or so as to be further toward the tubular portion than the side of the first knob opposite the tubular portion.

6. A spinning reel comprising:
    a handle having a handle arm with a knob shaft fixed on a tip of the handle arm;
    a reel unit rotatively supporting the handle;
    a rotor rotatively supported on a front of the reel unit;
    a spool disposed at a front of the rotor; and
    a handle knob rotatively mounted on the knob shaft, the handle knob including a tubular portion having an axis running therethrough in an axial direction, a knob portion including an outermost radial portion, a first knob with a substantially spherically shaped outer peripheral surface connected to an outer periphery of the tubular portion so as to cover a tip of the tubular portion and a second knob detachably mounted and unitarily linked on a side of the first knob opposite the tubular portion, the second knob having a substantially spherically shaped outer peripheral surface, and the first knob having a first space in an interior thereof and the second knob having a second space in the interior thereof that communicates with the first space; and an attachment member with an inner peripheral portion mounted and fixed to an outer periphery of the tip of the tubular portion and an outer portion configured to be coupled to the second knob by a plurality of screw members inserted from outside of the outer peripheral surface of the second knob.

7. A dual bearing reel comprising:

a handle having a handle arm with a knob shaft fixed on a tip of the handle arm;

a reel unit rotatively supporting the handle;

a spool rotatively mounted on the reel unit; and a handle knob rotatively mounted on the knob shaft, the handle knob including a tubular portion having an axis running therethrough in an axial direction, a knob portion including an outermost radial portion, a first knob with a substantially spherically shaped outer peripheral surface connected to an outer periphery of the tubular portion so as to cover a tip of the tubular portion and a second knob detachably mounted and unitarily linked on a side of the first knob opposite the tubular portion, the second knob having a substantially spherically shaped outer peripheral surface, and the first knob having a first space in an interior thereof and the second knob having a second space in the interior thereof that communicates with the first space; and an attachment member with an inner peripheral portion mounted and fixed to an outer periphery of the tip of the tubular portion and an outer portion configured to be coupled to the second knob by a plurality of screw members inserted from outside of the outer peripheral surface of the second knob.

8. A handle assembly for mounting on a tip of a handle shaft of a fishing reel comprising:

a handle arm having a base end and a tip, the handle arm being configured and arranged to extend substantially perpendicular to an axial center of the handle shaft and further configured and arranged to be mounted to the handle shaft at the base end;

a knob shaft fixed to the tip of the handle arm and extending in a direction substantially perpendicular to the handle arm; and a handle knob rotatively mounted on the knob shaft, the handle knob including a tubular portion having an axis running therethrough in an axial direction, a knob portion including an outermost radial portion, a first knob with a substantially spherically shaped outer peripheral surface connected to an outer periphery of the tubular portion so as to cover a tip of the tubular portion and a second knob detachably mounted and unitarily linked on a side of the first knob opposite the tubular portion, the second knob having a substantially spherically shaped outer peripheral surface, and the first knob having a first space in an interior thereof and the second knob having a second space in the interior thereof that communicates with the first space; and an attachment member with an inner peripheral portion mounted and fixed to an outer periphery of the tip of the tubular portion and an outer portion configured to be coupled to the second knob by a plurality of screw members inserted from outside of the outer peripheral surface of the second knob.

9. A handle knob for a fishing reel comprising:

a tubular portion having an axis running therethrough in an axial direction; and a knob portion including an outermost radial portion, a first knob with a substantially spherically shaped outer peripheral surface connected to an outer periphery of the tubular portion so as to cover a tip of the tubular portion and a second knob detachably mounted and unitarily linked on a side of the first knob opposite the tubular portion, the second knob having a substantially spherically shaped outer peripheral surface, and the first knob having a first space in an interior thereof and the second knob having a second space in the interior thereof that communicates with the first space, the first knob having a first separate member and a second separate member.

10. The handle knob for a fishing reel according to claim 9, wherein the first separate member and the second knob being constructed of the same material, and the second separate member being constructed of a different material than the first separate member and the second knob.

* * * * *